US012771521B2

(12) United States Patent
Wang et al.

(10) Patent No.: US 12,771,521 B2
(45) Date of Patent: Oct. 20, 2026

(54) FREQUENCY DIVISION DUPLEX BAND INCLUDING MULTIPLE FREQUENCY BANDS OF A CELL

(71) Applicant: Apple Inc., Cupertino, CA (US)

(72) Inventors: Fucheng Wang, Cupertino, CA (US); Alexander Sayenko, Munich (DE); Anatoliy S. Ioffe, Sunnyvale, CA (US)

(73) Assignee: Apple Inc., Cupetino, CA (US)

( * ) Notice: Subject to any disclaimer, the term of this patent is extended or adjusted under 35 U.S.C. 154(b) by 184 days.

(21) Appl. No.: 18/773,472

(22) Filed: Jul. 15, 2024

(65) Prior Publication Data

US 2026/0019226 A1 Jan. 15, 2026

(51) Int. Cl.

| | |
|---|---|
| ***H04L 5/14*** | (2006.01) |
| ***H04W 72/0453*** | (2023.01) |
| ***H04W 72/51*** | (2023.01) |

(52) U.S. Cl.

CPC .......... *H04L 5/14* (2013.01); *H04W 72/0453* (2013.01); *H04W 72/51* (2023.01)

(58) Field of Classification Search

CPC ...... H04L 5/14; H04L 5/001; H04W 72/0453; H04W 72/51; H04W 8/24

See application file for complete search history.

(56) References Cited

U.S. PATENT DOCUMENTS

| | | | | |
|---|---|---|---|---|
| 10,973,025 | B1 | 4/2021 | Zhou et al. | |
| 2014/0161077 | A1 | 6/2014 | Choi et al. | |
| 2016/0249359 | A1* | 8/2016 | Yamazaki ......... | H04W 72/0453 |
| 2022/0069956 | A1 | 3/2022 | Schober et al. | |
| 2022/0322350 | A1* | 10/2022 | Sayenko ............ | H04B 7/18504 |
| 2023/0300810 | A1 | 9/2023 | Xue et al. | |
| 2025/0097926 | A1* | 3/2025 | Liu .................. | H04W 72/0453 |

OTHER PUBLICATIONS

U.S. Appl. No. 18/773,481, "Non-Final Office Action", Jul. 8, 2026, 21 pages.

* cited by examiner

*Primary Examiner* — Austin J Moreau
(74) *Attorney, Agent, or Firm* — Kilpatrick Townsend & Stockton LLP

(57) ABSTRACT

The present application relates to improve the data communications between a user equipment (UE) and a base station. In an example, the UE can indicate, to the base station, its support of pairing an uplink band with a downlink band to define a frequency division duplex (FDD) band. The uplink band can belong to a first frequency band, whereas the downlink band can belong to a second frequency band. The base station can configure the FDD band for the UE in association with a cell. Data communications can accordingly be performed using FDD.

20 Claims, 20 Drawing Sheets

600

FREQUENCY DIVISION DUPLEX BAND INCLUDING MULTIPLE FREQUENCY BANDS OF A CELL

BACKGROUND

Cellular network coverage can enable communications between a user equipment and a cellular network. Generally, when the user equipment is within the cellular network coverage, the user equipment can send uplink data in an uplink band to the cellular network and receive downlink data in a downlink band from the cellular network. Improved throughput and power consumption are typical design goal. Challenges exist due to multiple factors, such as interference between the uplink band and the downlink band.

DETAILED DESCRIPTION

Figure 1:
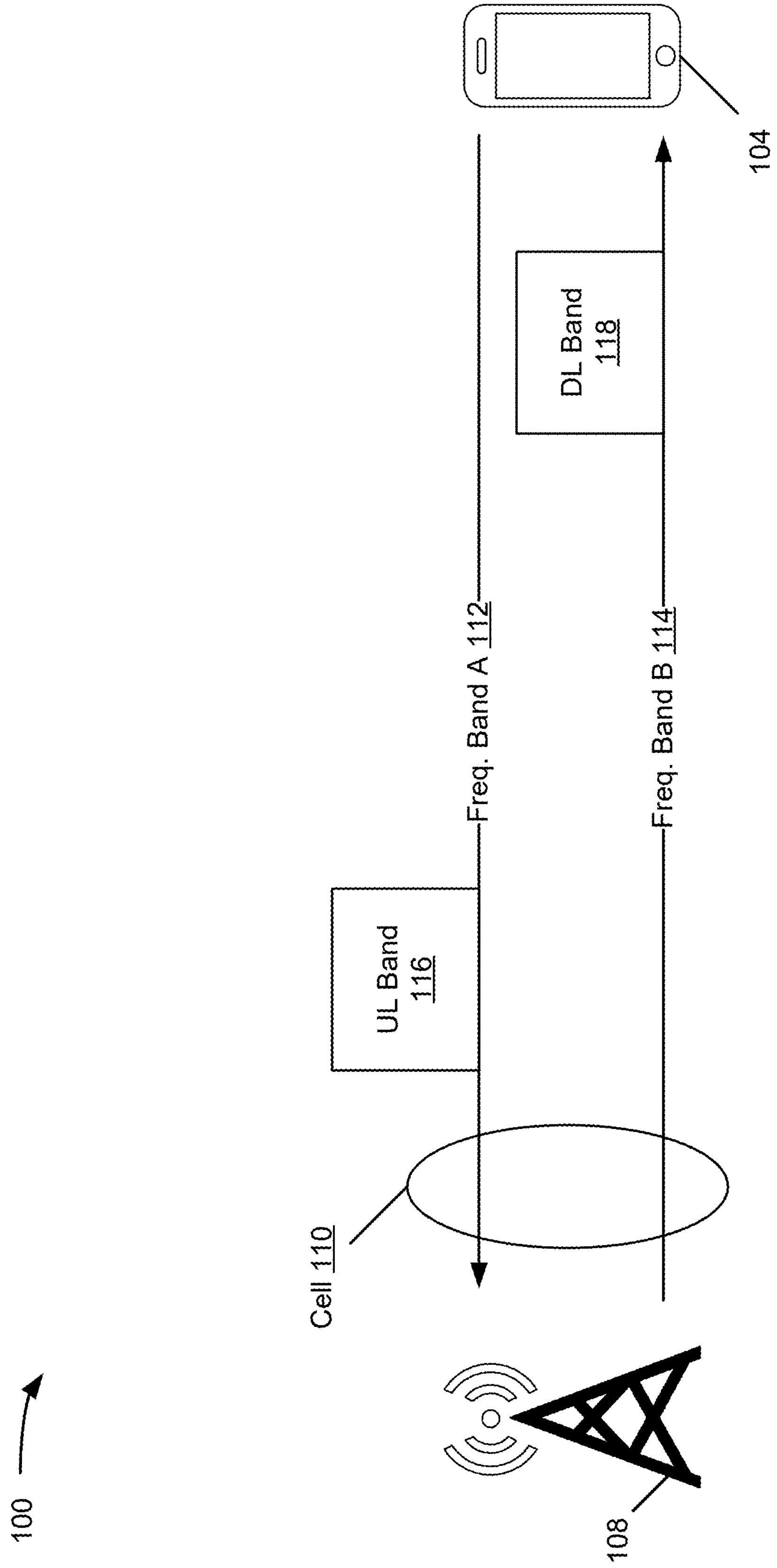
FIG. 1 illustrates a network environment, in accordance with some embodiments.

Embodiments of the present disclosure are directed to, among other things, improving communications between a user equipment (UE) and a base station. In an example, frequency division duplexing (FDD) is used for the communication. An FDD band can be configured for the UE, where the FDD band includes a set of frequency bands and can be associated with a cell (e.g., for illustrative purposes, frequency band n25 and frequency band 26 associated with a serving cell). The set of frequency bands can represent a flexible pairing for the data communications associated with the cell. The pairing can be identified using a single identifier (e.g., "n25-n26") and can be treated as if the FDD band was a single frequency band (instead of multiple individual frequency bands). An uplink band within a first frequency band of the set can be used for uplink transmissions by the UE (e.g., an uplink band within the frequency band n25). A downlink band within a second frequency band of the set can be used for downlink receptions by the UE (e.g., a downlink band within the frequency band 26). The frequency separation between the uplink band and the downlink band is typically sufficiently large (e.g., due to the uplink band being within the n25 band and the downlink band being within the n26 band) such that interference between the uplink chain and downlink chain of the UE (e.g., the self-interference) is reduced, minimized, or even eliminated. Further, no complex radio frequency (RF) front end of the UE (e.g., its duplexer and/or diplexer) needs to be designed to enable pairing the set of frequency bands. Particularly, given the frequency separation, common band pass filters can be implemented to mitigate the self-interference.

Furthermore, at the resource block level, no constraints need to be imposed on the uplink resource blocks used for the uplink transmissions. Similarly, no constraints need to be imposed on the downlink resource blocks used for the data receptions. The resource block constraints can be avoided due to the frequence separation. When communicating with the base station, the UE can determine that, for data communications associated with the cell, the FDD band is to be used. Because the FDD band is to be used, no resource block constraints need to be applied. Accordingly, the entire full set of uplink resource blocks and/or the entire full set of downlink resource blocks can be used for the data communications, thereby increasing the bandwidth and throughput without negatively impacting the self-interference. The UE's power consumption can also be improved because the UE is capable of sending and/or receiving data in a relatively shorter amount of time (e.g., due to the increased bandwidth), thereby enabling it to more often operate in an idle or inactive state.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc., in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processing circuitry" as used herein refers to, is part of, or includes circuitry capable of sequentially and automatically carrying out a sequence of arithmetic or logical operations, or recording, storing, or transferring digital data. The term "processing circuitry" may refer to an application processor, a baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The terms "device" and "user equipment (UE)" as used herein refers to a wired and/or wireless computing device with radio communication capabilities and that may use network resources in a communications network. The terms "device" and "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

The term "base station" as used herein refers to a device with radio communication capabilities, that is a network component of a communications network (or, more briefly, a network), and that may be configured as an access node in the communications network. A device's access to the communications network may be managed at least in part by the base station, whereby the UE connects with the base station to access the communications network. Depending on the radio access technology (RAT), the base station can be referred to as a gNodeB (base station), eNodeB (eNB), access point, etc.

The term "network" as used herein reference to a communications network that includes a set of network nodes configured to provide communications functions to a plurality of user equipment via one or more base stations. For instance, the network can be a public land mobile network (PLMN) that implements one or more communication technologies including, for instance, 5G communications.

The term "connected" may mean that two or more elements, at a common communication protocol layer, have an established signaling relationship with one another over a communication channel, link, interface, or reference point.

FIG. 1 illustrates a network environment 100, in accordance with some embodiments. The network environment 100 may include a UE 104 and a base station 108. The base station 108 may provide a wireless access cell; for example, a Third-Generation Partnership Project (3GPP) cell (e.g., new radio (NR) 5G cell, a 6G cell, etc.) through which the UE 104 may communicate with the base station 108. This base station may be a component of a network (e.g., a 3GPP cellular network). The UE 104 and the base station 108 may communicate over an interface compatible with 3GPP technical specifications.

As further described in the next figures, the communications may be associated with a cell 110 (e.g., having a cell identifier) that is provided by the base station 108 and that may be available to the UE 104 (and possibly to other UEs). The communications can involve an FDD band formed by a set of frequency bands that have been paired as a single frequency band. In the illustration of FIG. 1, two frequency bands are shown: frequency band A 112 used for uplink, and frequency band B 114 used for downlink. Transmissions by the UE 104 to the base station 108 rely on an uplink band 116 within the frequency band A 112. Receptions by the UE 104 from the base station 108 rely on a downlink band 114 within the frequency band B 114. The frequency band A 112 and the frequency band B 114 may be separated from each other by a frequency separation larger than a predefined threshold (e.g., 100 MHz), which enables reducing, minimizing, or elimination interference between an uplink chain and a downlink chain of an RF front end of the UE 104. Generally, the frequency bands (e.g., the frequency band A 112 and the frequency band B 114) that are paired to form an FDD band can be available from a same network operator (although it is possible that they can be from different network operators that have an agreement between them, such as a roaming agreement).

The base station 108 may transmit information (for example, data and control signaling) in the downlink direction by mapping logical channels on the transport channels, then transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink control channel (PDCCH); and a physical downlink shared channel (PDSCH). In FIG. 1, such channels can have frequency resources allocated in the frequency band B 114 (e.g., belonging to the downlink band 118).

The PBCH may be used to broadcast system information that the UE 104 may use for initial access to a serving cell. The PBCH may be transmitted along with primary synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the base station 108 to allocate both uplink and downlink resources. The DCI may also be used to provide uplink power control commands, configure a slot format, or indicate that preemption has occurred.

The base station 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include CSI-RS. The CSI-RS may be a multi-purpose downlink transmission that may be used for CSI reporting, beam management, connected mode mobility, radio link failure detection, beam failure detection and recovery, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain, and one orthogonal frequency division multiplexing (OFDM) symbol in the time domain. Twelve consecutive subcarriers in the frequency domain may compose a physical resource block (PRB). A resource element group (REG) may include one PRB in the frequency domain, and one OFDM symbol in the time domain, for example, twelve resource elements. A control channel element (CCE) may represent a group of resources used to transmit PDCCH. One CCE may be mapped to a number of REGs; for example, six REGs.

The UE 104 may transmit data and control information to the base station 108 using physical uplink channels. Different types of physical uplink channels are possible, including a physical uplink control channel (PUCCH) and a physical uplink shared channel (PUSCH). Whereas the PUCCH carries control information from the UE 104 to the base station 108, such as uplink control information (UCI), the PUSCH carries data traffic (e.g., end-user application data) and can carry UCI. In FIG. 1, such channels can have frequency resources allocated in the frequency band A 112 (e.g., belonging to the uplink band 116).

In an example, communications with the base station 108 can use channels in the frequency range 1 (FR1) band and/or frequency range 2 (FR2) band, although other frequency ranges are possible (e.g., the frequency band A 112 and/or the frequency band B 114 can belong to FR1 and/or FR2). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device applies a clear channel assessment (CCA) check before using the channel.

The UE 104 can be located within a network coverage. In particular, the base station 108 may provide the network coverage with signaling (e.g., which may be carried by one or more beams). The network coverage may represent the cell 110 or a portion of the cell 110 that the base station 108 provides. The network coverage may provide network connections to multiple UEs, similar to the UE 104. These UEs may communicate with the base station 108 on both the uplink and the downlink based on channels available to them when the UEs are in the network coverage (e.g., using the frequency band A 112 and/or the frequency band B 114).

In an example, the UE 104 supports carrier aggregation (CA), whereby the UE 104 can connect and exchange data simultaneously over multiple component carriers (CCs) with the base station 108. The CCs can belong to the same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC or multiple CCs. In CA, the CCs for a serving cell belong to the same frequency band, but not to multiple frequency bands. A serving cell can be a primary (PCell), a primary secondary cell (PSCell), or a secondary cell (SCell). Multiple SCells can be activated via an SCell activation procedures where the component carriers of these serving cells can be intra-band contiguous, intra-band noon-contiguous, or inter-band. The serving cells can be collocated or non-collocated.

Figure 2:
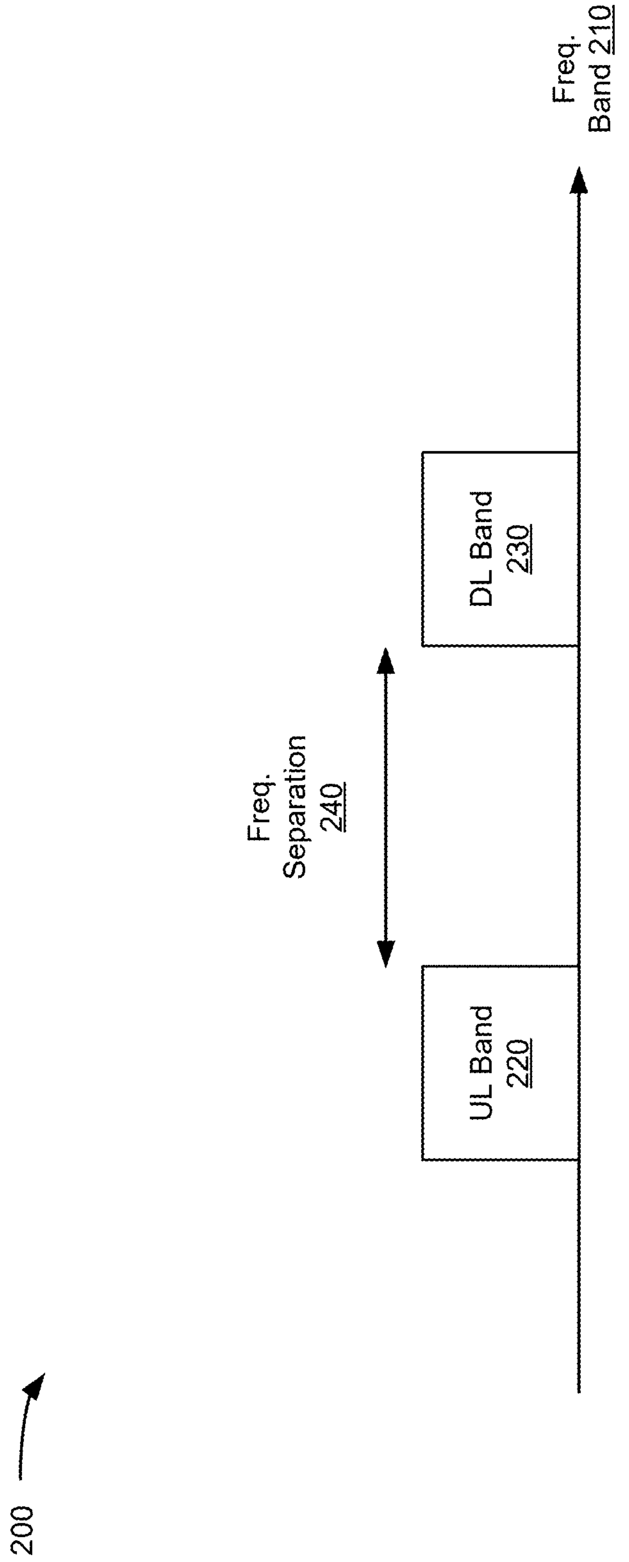
FIG. 2 illustrates an example of frequency division duplexing (FDD)-based communications using a frequency band, in accordance with some embodiments.

FIG. 2 illustrates an example of FDD-based communications 200 using a frequency band 210, in accordance with some embodiments. Generally, a frequency band (e.g., the frequency band 210 and other frequency bands described herein) refers to a specific range of electromagnetic frequencies designated for use in transmitting and receiving data. These frequency bands can allocated by a regulatory body (and can be licensed or unlicensed) to a specific cellular network operator (e.g., in the case of a licensed frequency band). FDD represents a technique that allows simultaneous transmission and reception of data using a frequency band.

In the illustration of FIG. 2, an uplink band 220 and a downlink band 230 within the frequency band 210 are used. The uplink band 220 is used for uplink transmission from a UE to a base station (e.g., communications from the UE 104 to the base station 108). The downlink band 230 is used for downlink reception (e.g., communications from the base station 108 to the UE 104). In the frequency domain, the uplink band 220 may have lower frequencies than the downlink band 230 or vice versa. The uplink band 220 and the downlink band 230 are separated by a certain frequency gap (shown in FIG. 2 as a frequency separation 204). Because the uplink band 220 and the downlink band 230 belong to the same frequency band 210, interference may exist between the uplink band 220 and the downlink band 230 (e.g., interference between the uplink chain and the downlink chain of the UE's front end, referred to as self-interference). FDD full-duplex operation needs to ensure sufficient isolation between the uplink band 220 and the downlink band 230 to prevent the uplink transmission from interfering with downlink reception. Different approaches can be used to mitigate this interference, as described in the next figures. However, such approaches may result in sub-optimal use of the frequency spectrum, reduction in uplink bandwidth and/or downlink bandwidth, and/or complex RF front end designs (e.g., of the duplexer and/or diplexer).

Figure 3:
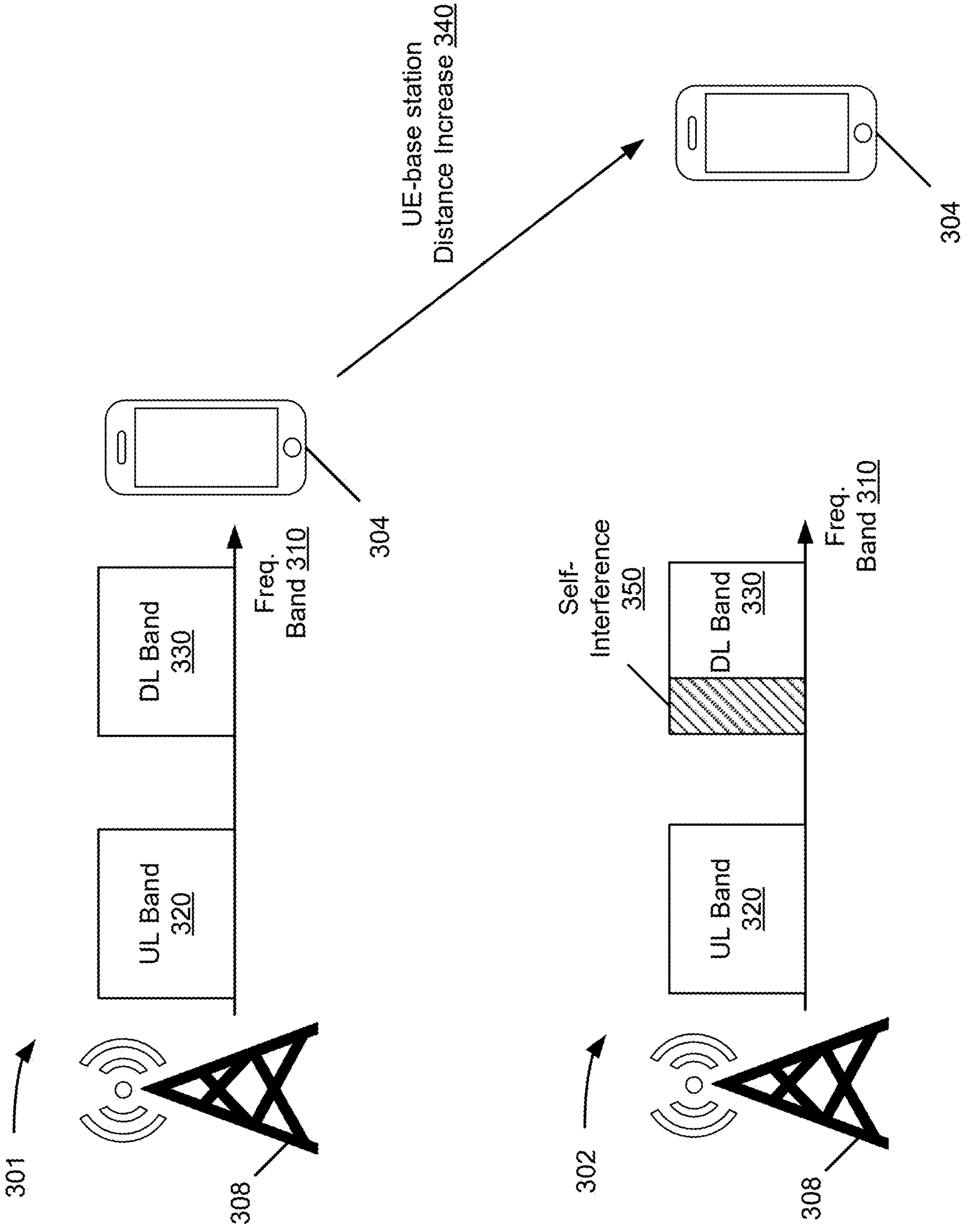
FIG. 3 illustrates an example of self-interference associated with FDD-based communications using a frequency band, in accordance with some embodiments.

FIG. 3 illustrates an example of self-interference 350 associated with FDD-based communications using a frequency band 310, in accordance with some embodiments. As illustrated, a UE 304 (e.g., the UE 104) and a base station 308 (e.g., the base station 108) communicates using an uplink band 320 and a downlink band 330 of the frequency band 310, where the communications are performed according to FDD. While the UE 304 is at a distance from the base station 308, the FDD-based communications may not result in self-interference. However, upon an increase to this distance (shown as a UE-base station distance increase 340), the self-interference 350 may occur. This can be the case, for example, when the UE 304 is at the cell edge. In such a case, the UE 304 increases its uplink transmission power, which may result in the uplink transmission interfering on the uplink band 320 with the downlink reception on the downlink band 330. Of course, other cases and/or factors may cause the self-interference 350 (e.g., including, but not limited to, channel conditions between the UE 304 and the base station 308). The self-interference 350 may impact a portion of the downlink band 330 (e.g., the portion closest in frequency to the uplink band 320) or the entirety of the downlink band 330 (e.g., depending on the uplink transmission power, the frequency separation between the uplink band 320 and the downlink band 330, and/or the RF front end design, among other factors). The impact may result in a deterioration of the downlink reception.

Figure 4:
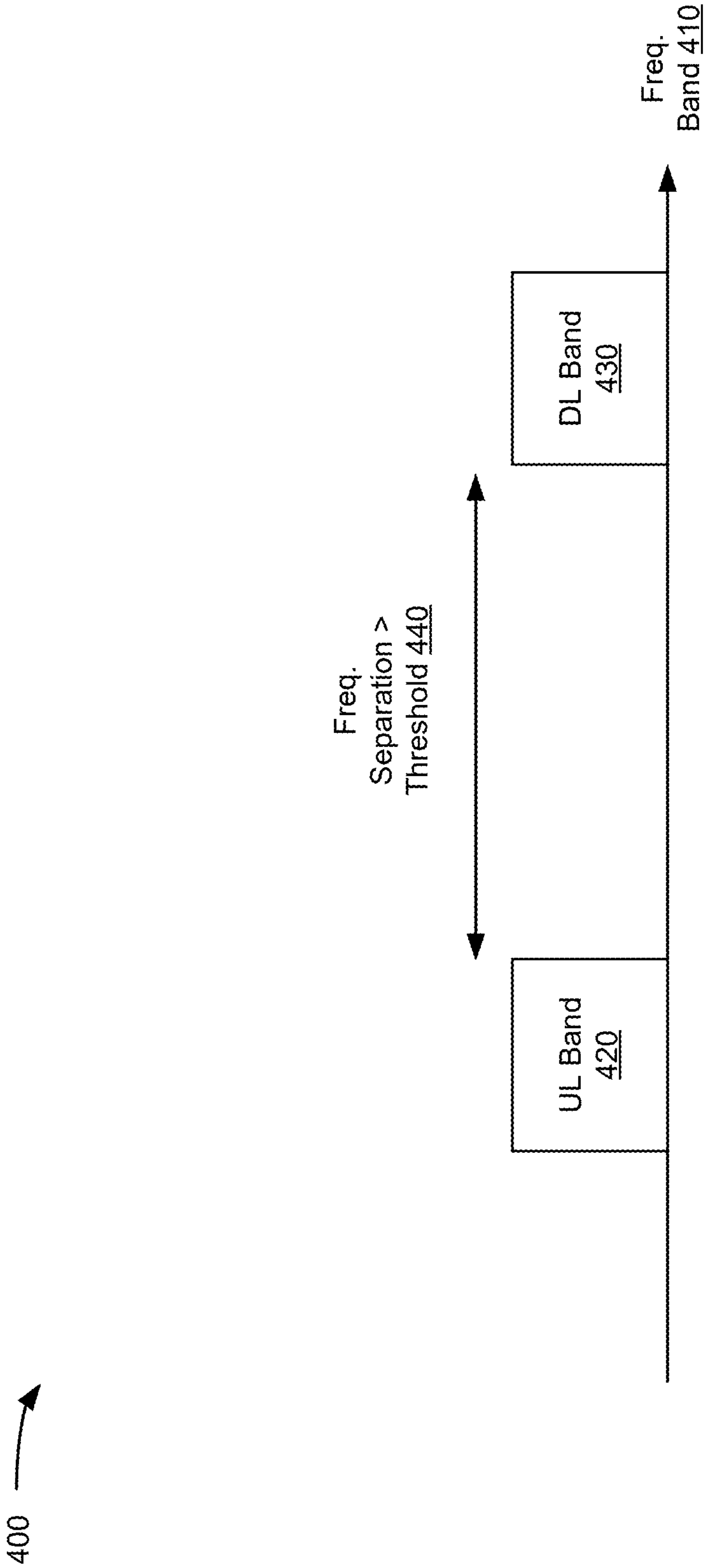
FIG. 4 illustrates an example of an approach to reduce self-interference, in accordance with some embodiments.

FIG. 4 illustrates an example of an approach 400 to reduce self-interference, in accordance with some embodiments. Like FIGS. 2-3, an uplink band 420 and a downlink band 430 within a frequency band 410 are used for FDD. The uplink band 420 and the downlink band 430 are separated by a frequency gap (referred to as a frequency separation in FIG. 4). In the approach 400, the frequency separation is set to be larger than a frequency spacing threshold (shown as "frequency separation>threshold 440"). However, doing so can reduce the usability of the full frequency spectrum that would have been otherwise available from the frequency band 410. Further, doing so may not support certain communications standards. For example, in 4G and 5G cellular networks, most FDD bands are defined with less than 100 MHz duplex. As such, if the frequency spacing threshold is larger than 100 MHz, these FDD bands would not be supported. For FDD bands having a frequency range less than 1 GHz, the duplexer spacing can be less than 50 MHz.

Figure 5:
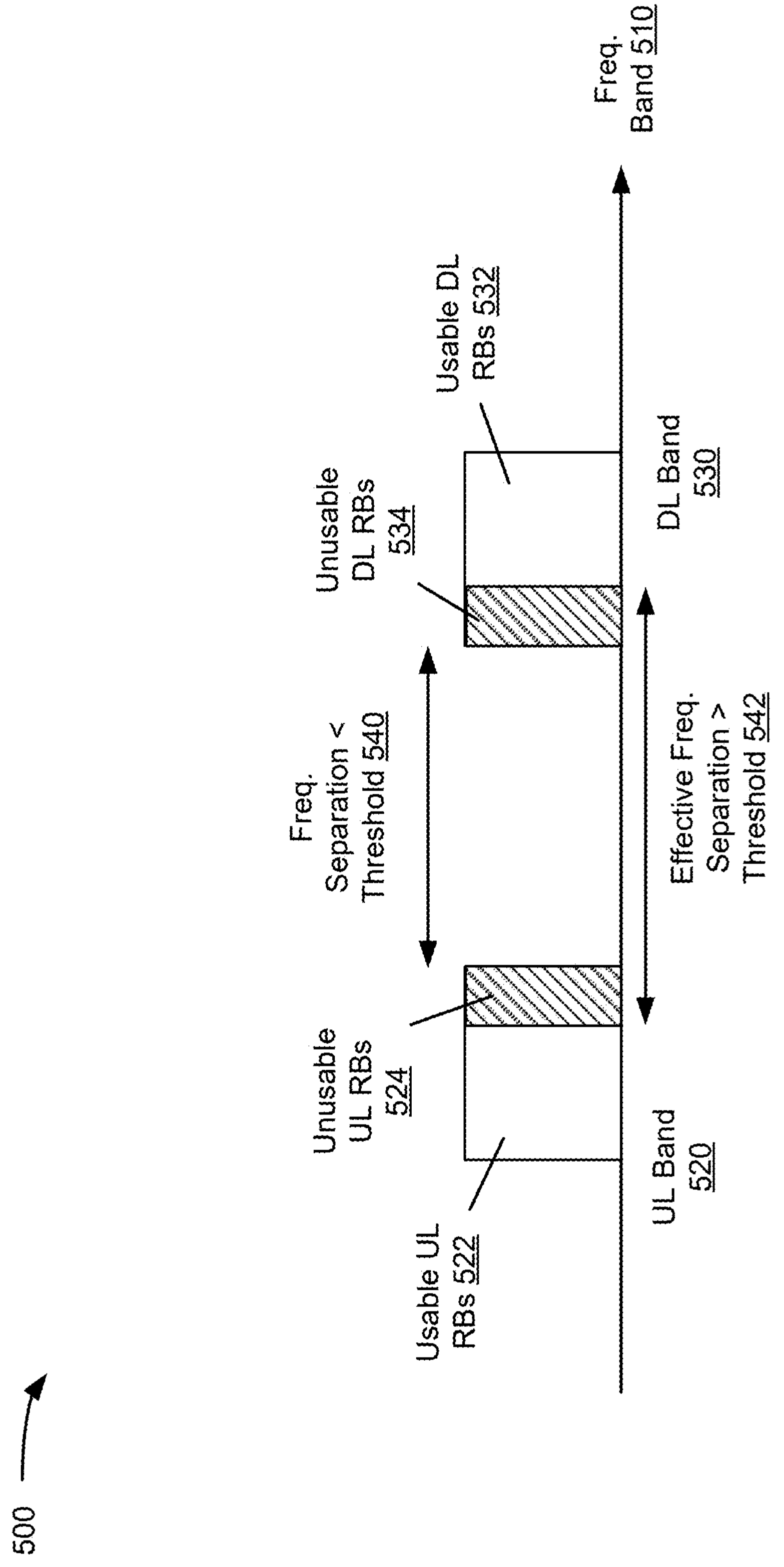
FIG. 5 illustrates an example of another approach to reduce self-interference, in accordance with some embodiments.

FIG. 5 illustrates an example of another approach 500 to reduce self-interference, in accordance with some embodiments. Like FIGS. 2-3, an uplink band 520 and a downlink band 530 within a frequency band 510 are used for FDD. The uplink band 520 and the downlink band 530 are separated by a frequency gap (referred to as a frequency separation in FIG. 5). Unlike the approach 400 of FIG. 4, in the approach 500, the frequency separation is set to be smaller than a frequency spacing threshold (shown as "frequency separation<threshold 540"). For example, in support of 4G and 5G cellular networks, the frequency separation can be less than 100 MHz or 50 MHz. Instead, only a portion of the uplink band 520 and/or only a portion of the downlink band 530 are used for FDD. As such, partial bandwidth (for uplink transmission and/or downlink transmission) is used, which may result in an effective frequency separation larger than the frequency spacing threshold (shown as "effective frequency separation>threshold 542").

More particularly, the uplink band 520 includes uplink resource blocks. Similarly, the downlink band 530 includes downlink resource blocks. In an example, a resource block can include twelve frequency subcarriers in the frequency domain and can span a slot in the time domain. The number of resource blocks forms, in the frequency domain, a bandwidth (e.g., a bandwidth of the uplink band 520 or the downlink band 530 as the case may be). Per the approach 500, a partial uplink bandwidth may be used. Accordingly, not all uplink resource blocks can be allocated for the uplink transmission. Instead, only a subset thereof is allocated (shown as "usable UL RBs 522"), whereas the remaining subset is unallocated (shown as "unusable UL RBs 524"). Typically, the unallocated resource block(s) is(are) the closest ones to the downlink band 530. Additionally, or alternatively, per the approach 500, a partial downlink bandwidth may be used. Accordingly, not all downlink resource blocks can be allocated for the downlink reception. Instead, only a subset thereof is allocated (shown as "usable DL RBs 532"), whereas the remaining subset is unallocated (shown as "unusable DL RBs 534"). Typically, the unallocated resource block(s) is(are) the closest ones to the uplink band 520. The frequency separation between the usable uplink resource blocks 522 and the usable downlink resource blocks 524 can be larger than the frequency spacing threshold.

Although the approach 500 supports smaller frequency separation (e.g., duplex spacing) relatively to the approach 400, many challenges exist. First, the approach 500 may not use the full possible bandwidth. Second, the relatively small duplex spacing may complicate the duplexer design to achieve sufficient uplink and downlink isolation with acceptable insertion loss (in particular for FDD bands having a frequency range less than 1 GHz, where the duplexer spacing can be less than 50 MHz). Owing to the design challenge in duplexers to support FDD band full-duplex operation, they have been one of the costly RF components in radio front-end.

Figure 6:
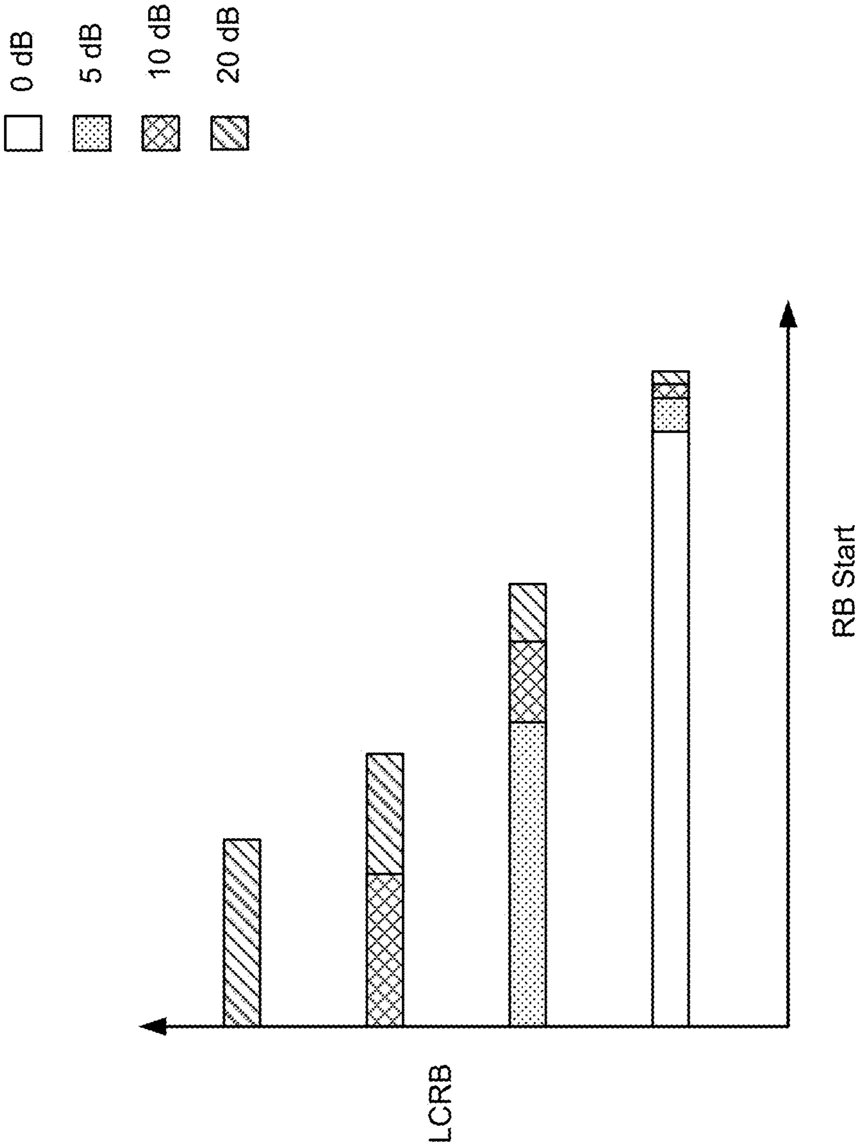
FIG. 6 illustrates an example of an impact to restricting resource blocks on self-interference and bandwidth, in accordance with some embodiments.

FIG. 6 illustrates an example of an impact 600 to restricting resource blocks on self-interference and bandwidth, in accordance with some embodiments. Restricting the resource blocks can be accomplished by using the approach 500 of FIG. 5. For instance, a restriction can limit the allocation of resource blocks available from an uplink band to only a portion of such resource blocks (e.g., to only the "usable UL RBs 522").

In FIG. 6, the horizontal axis represents the start of a resource block (e.g., the location, in the frequency domain of the first resource block where the allocated resource blocks start). The vertical axis represents the length of continuous resource block allocation (LCRB) for a UE (e.g., the total number of allocated resource blocks for the UE, where these resource blocks are contiguous in the frequency domain). The shading represents a reference sensitivity (REFSENS) maximum sensitivity degradation (MSD) in dBs. REFSENS can be defined as the minimum receive signal power level which may be demodulated by a receiver to achieve a certain threshold percentage of data throughput under a digital signal modulation scheme. The impact of self-interference to REFSENS degradation of the receiver for a frequency band can be defined as the MSD.

In the illustration of FIG. 6, the impact 600 for using a particular frequency band is shown. Blank refers to 0 dB impact. Dotted shading refers to a 5 dB impact. A diamond shading refers to 10 dB impact. A diagonal shading refers to 20 dB impact. Of course, the specific values and the different resource block starts and LCRBs are for illustrative purposes only. The specific values can depend on the RF front end design, the frequency band, the uplink bandwidth, and/or the downlink bandwidth among other factors.

As can be seen, the smaller the uplink bandwidth is (e.g., the smaller the LCRB is), the closer the start of the allocated resource block(s) can be to the downlink band with the least impact MSD (thereby allowing narrow duplex spacing). For instance, if only one resource block is allocated, that resource block can be the closest possible to the downlink band with a 0 dB impact. Conversely, the larger the uplink bandwidth (e.g., the greater the LCRB is), the more severe the MSD impact is (thereby preventing narrow duplex spacing). For example, at the maximum LCRB (e.g., full or near full bandwidth), a 20 dB MSD impact can be expected even when the resource block start is as far away as possible from the downlink band.

As such, despite that the duplexer technology for cellular FDD bands has advanced for years, the uplink-downlink band isolation for FDD bands with narrow duplex spacing is still rather insufficient to avoid the uplink to downlink self-interference at the REFSENS, in particular, for wider carrier bandwidth. Near full uplink allocation and depending on many factors, the MSD can be as high as 25 dB. In such a case, to reduce MSD to below 5 dB, the uplink allocation may need to be restricted to less than twenty resource blocks which would imply an inefficient UL spectrum utilization.

If existing FDD bands uplink and downlink ranges can be flexibly paired to provide sufficient duplex spacing, not only the uplink to downlink self-interference can be alleviated, but also the duplexer design may be eased. The next figures describe such flexible pairing of frequency bands to define a single FDD band for a cell.

Figure 7:
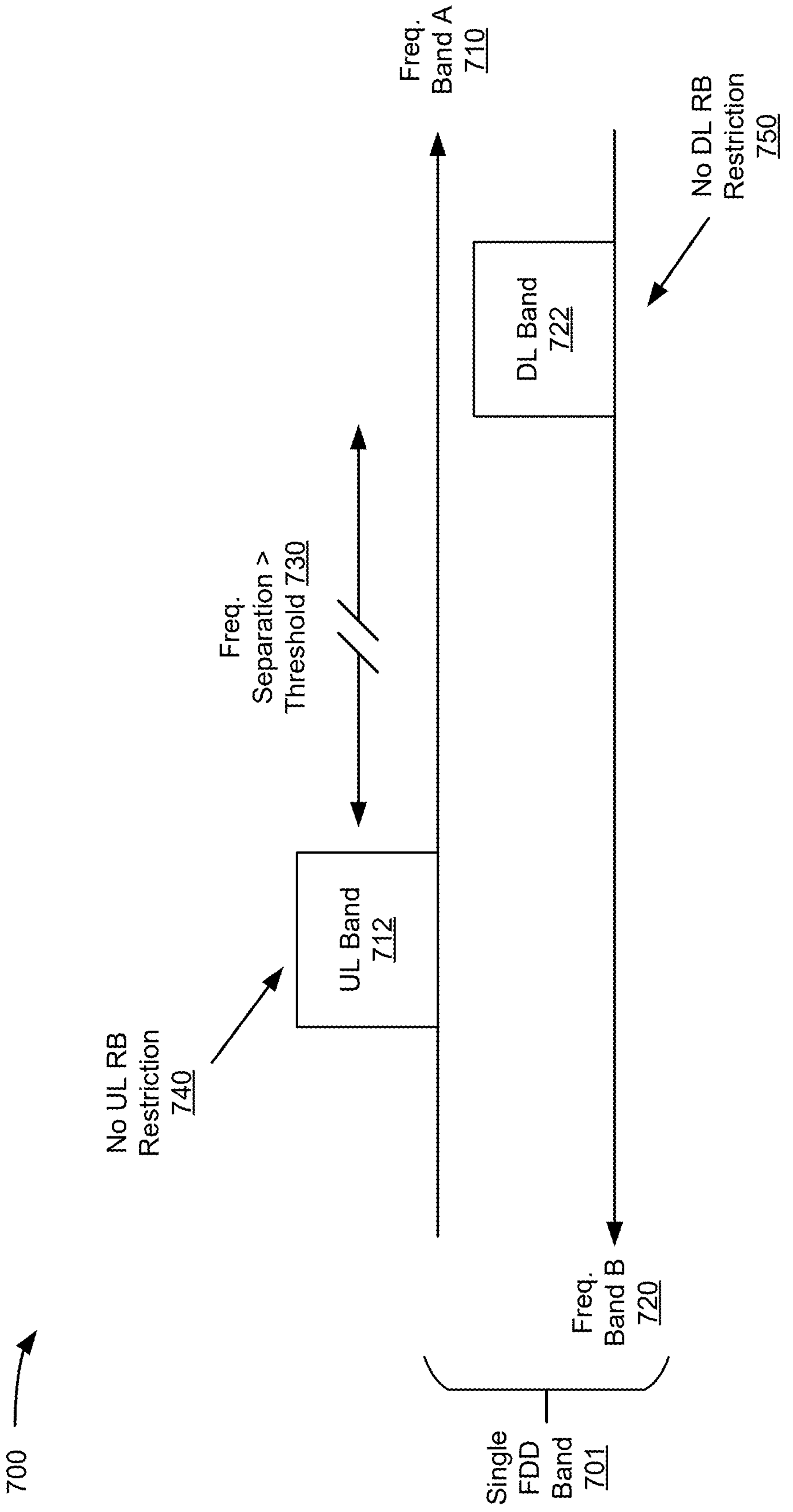
FIG. 7 illustrates another example of FDD-based communications using an FDD band that can include a set of frequency bands, in accordance with some embodiments.

FIG. 7 illustrates another example of FDD-based communications 700 using an FDD band 701 that can include a set of frequency bands, in accordance with some embodiments. In the illustration of FIG. 7, the set includes a frequency band A 710 and a frequency band B 720 that are paired to define a single FDD band of a same cell (e.g., a serving cell). The frequency band A 710 and the frequency band B 720 may be owned by a same network operator (although it may be possible that they may be owned by different network operators, where the pairing relies on an agreement between such operators, such as a roaming agreement). The pairing enables taking an uplink band 712 from the frequency band A 710 and a downlink band 722 from the frequency band B 720 to form an uplink band 712-downlink band 722 pair that represents the usable uplink resource blocks and downlink resource blocks of the single FDD band 701. The pairing can be referred to as uplink band-downlink band pairing that pairs an uplink band with a downlink band, an uplink-downlink pairing for short, or an uplink resource block-downlink resource block pairing that allocates resource block(s) from an uplink band and resource block(s) from a downlink band. The FDD band 701 can be referred to by a single identifier (e.g., a single band notation) and be treated as a single frequency band similarly to the frequency band 210, 310, 410, or 510 of FIGS. 2-5 (although it is made up of uplink and downlink bands belonging to two different frequency bands).

The frequency gap between the frequency band A 710 and the frequency band B 720 is generally large (e.g., larger than a frequency spacing threshold of 100 MHz or 50 MHz). Because the uplink band 712 actually belongs to one frequency band A 710 and the downlink band 722 belongs to another frequency band B 720, the frequency gap of the uplink band 712-downlink band 722 pair is also larger than the frequency spacing threshold (e.g., shown in FIG. 7 as "frequence separation>Threshold 730"). This large frequency separation can reduce, minimize, or eliminate the self-interference. Accordingly, no uplink resource block restriction 740 may be imposed on the allocation of resource blocks from the uplink band 712. Likewise, no downlink resource block restriction 750 may be imposed on the allocation of resource blocks from the downlink band 722. Because no restrictions are imposed, the full uplink bandwidth and the full downlink bandwidth can be used without a significant MSD impact (e.g., a 0 dB MSD or substantially a 0 dB MSD can be achieved).

To illustrate, consider the example of the frequency band n25 and the frequency band n26. The frequency band n25 is identified by the identifier "n25," has an uplink range of 1,850 MHz to 1,915 MHz, and a downlink range of 1,930 MHz to 1,995 MHz. In comparison, the frequency band n26 is identified by the identifier "n26," has an uplink range of 814 MHz to 849 MHz, and a downlink range of 859 MHz to 894 MHz. Two single FDD bands can be defined using an uplink band that belongs to one of the frequency band n25 and the frequency band n26 and downlink band that belongs to the other one of the frequency band n25 and the frequency band n26.

The first FDD band can be identified as "n25U-n26D." The "U" indicates that an uplink band from the frequency band n25 is to be allocated for the uplink transmission using this first FDD band. The "D" indicates that a downlink band from the frequency band n26 is to be allocated for the downlink reception using this first FDD band. As such, the first FDD band includes an uplink band belonging the uplink range of 1,850 MHz to 1,915 MHz and a downlink band belonging the downlink range of 859 MHz to 894 MHz. The frequency separation between the uplink band and the downlink band is larger than 956 MHz, which can enable the use of a simple design (e.g., providing band pass filters) that provides sufficient uplink and downlink isolation to reduce or eliminate the MSD.

Similarly, the second FDD band can be identified as "n26U-n25D." The "U" indicates that an uplink band from the frequency band n26 is to be allocated for the uplink transmission using this first FDD band. The "D" indicates that a downlink band from the frequency band n25 is to be allocated for the downlink reception using this first FDD band. As such, the second FDD band includes an uplink band belonging the uplink range of 814 MHz to 849 MHz and a downlink band belonging the downlink range of 1,930 MHz to 1,995 MHz. The frequency separation between the uplink band and the downlink band is larger than 1,081 MHz, which can also enable the use of a simple design (e.g., providing band pass filters) that provides sufficient uplink and downlink isolation to reduce or eliminate the MSD.

Flexible FDD band pairing can be properly arranged to provide sufficient frequency separation between uplink and downlink for the new band pair to avoid self-interference. As a result, uplink resource block restriction is no longer needed near the downlink sensitivity level as opposed to the conventional FDD bands with narrow duplex spacing. Using n25 and n26 with flexible FDD band pairing as an example, Table 1 below compares the REFSENS performance between the conventional FDD bands and the uplink-downlink band pairings defining single FDD bands.

TABLE 1

| Notation | UL Range (MHz) | DL Range (MHz) | Duplex Spacing (MHz) | Max. UL bandwidth (MHz) | Max. DL bandwidth (MHz) | No. of UL RBs | UL RB Restriction | REFSENS (dBm) | MSD (dB) |
|---|---|---|---|---|---|---|---|---|---|
| n25 | 1850-1915 | 1930-1995 | 80 | 30 | 30 | 48 | Yes, resulting in partial bandwidth | −82.2 | 6.2 |
| n26 | 814-849 | 859-849 | 45 | 20 | 30 | 25 | Yes, resulting in partial bandwidth | −81.7 | 7.7 |
| n25U-n26D | 1850-1915 | 859-894 | Between 961 and 1051 | 30 | 30 | 160 | No, resulting in full bandwidth | −89.4 | 0 |
| n26U-n25D | 1930-1995 | 1930-1995 | Between 1086 and 1176 | 20 | 30 | 100 | No, resulting in full bandwidth | −88.4 | 0 |

Table 1 shows that frequency bands n25 and n26 at 30 MHz downlink channel bandwidth, even with uplink resource block allocation heavily restricted, a substantial REFSENS degradation still exists. In comparison, when the first FDD band n25U-26D or the second FDD band 26U-n25D is used according to the uplink-downlink pairings, no REFSENS degradation occurs even with a full uplink resource block allocation (which allows the use of the maximum uplink bandwidth).

Figure 8:
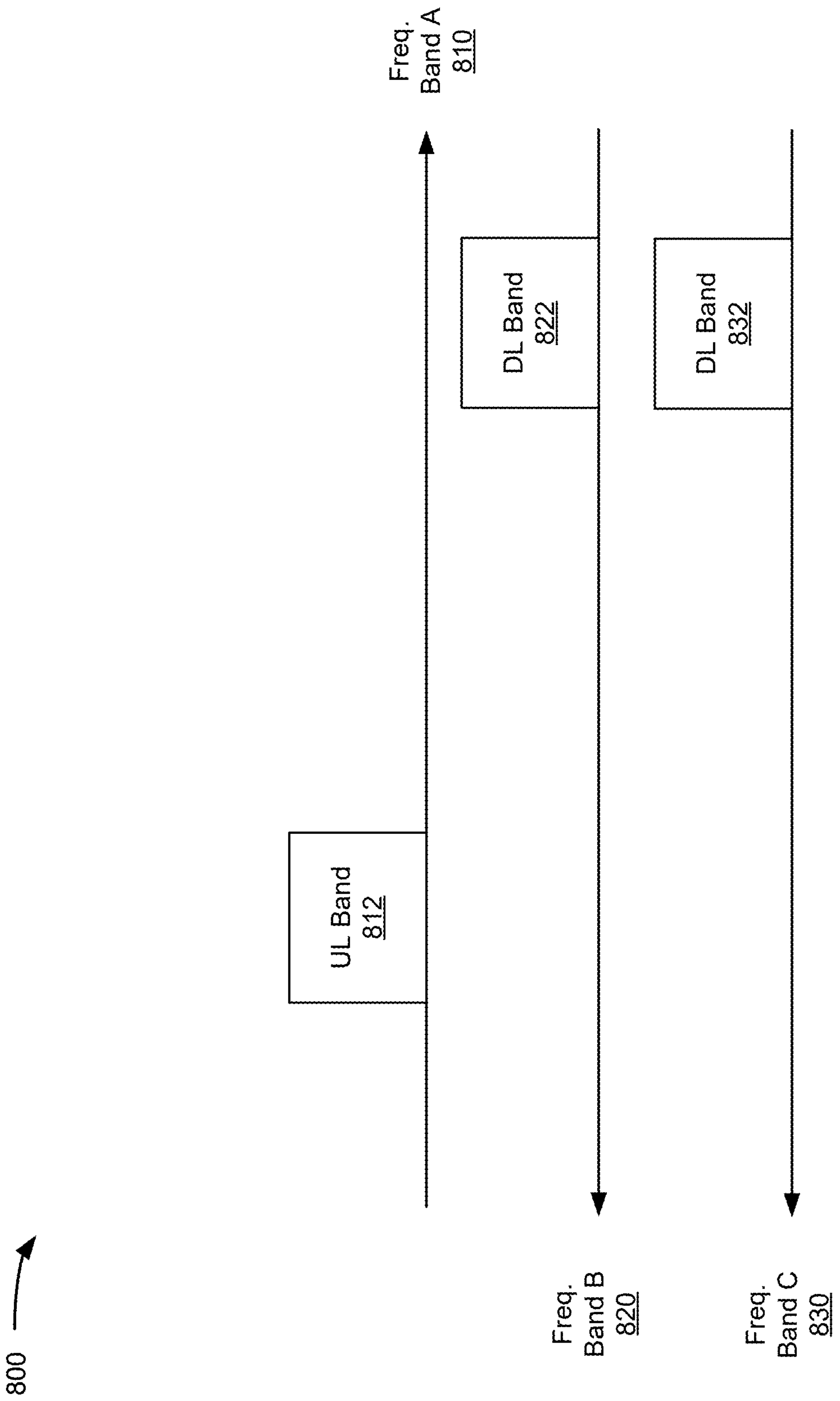
FIG. 8 illustrates an example of an FDD band that includes multiple frequency bands, in accordance with some embodiments.

FIG. 8 illustrates an example of an FDD band 800 that includes multiple frequency bands, in accordance with some embodiments. In the illustration of FIG. 8, the set includes three frequency bands: a frequency band A 810, a frequency band B 820, and a frequency band C 830 that are paired to define the FDD band 800. The three frequency band may be owned by a same network operator (although it may be possible that they may be owned by different network operators, where the pairing relies on an agreement between such operators, such as a roaming agreement). The pairing enables taking an uplink band 812 from the frequency band A 810 to be paired with a downlink band 822 from the frequency band B 820 and a downlink band 832 from the frequency band C 830. The FDD band 800 can be referred to by a single identifier (e.g., a single band notation) and be treated as a single frequency band similarly to the frequency band 210, 310, 410, or 510 of FIGS. 2-5 (although it is made up of uplink and downlink bands belonging to three different frequency bands in FIG. 8).

In the case of three frequency bands, variations to the pairing may be possible. For example, two uplink bands (e.g., one belonging to the frequency band A 810 and one belonging to the frequency band B 820) can be paired with a downlink band (e.g., one belonging to the frequency band C 830).

Figure 9:
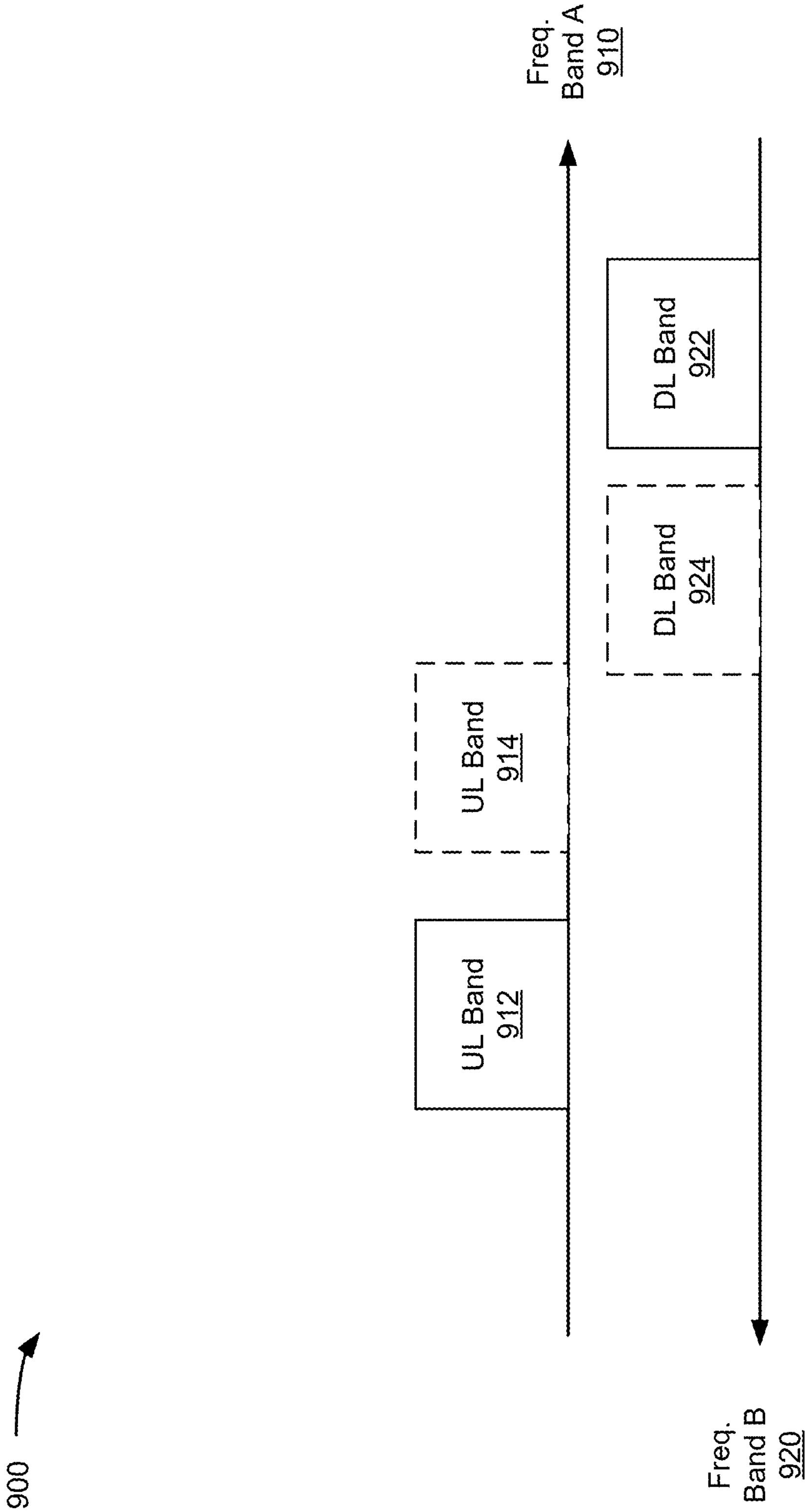
FIG. 9 illustrates an example of an FDD band that includes multiple uplink bands within a frequency band and/or multiple downlink bands within another frequency band, in accordance with some embodiments.

FIG. 9 illustrates an example of an FDD band 900 that includes multiple uplink bands within a frequency band and/or multiple downlink bands within another frequency band, in accordance with some embodiments. In the illustration of FIG. 9, the FDD band 900 is formed by pairing an uplink band 912 of a frequency band A 910 with a downlink band 922 of a frequency band B 920. Further, the pairing includes an additional uplink band 914 of the frequency band A 910 and/or an additional downlink band 924 of the frequency band B 920. The additional uplink band 914 and the additional downlink band 924 are illustrated using dashed boxes to indicate that the use of one of them is sufficient, although it may be possible to use them both. The FDD band 900 can be referred to by a single identifier (e.g., a single band notation) and be treated as a single frequency band similarly to the frequency band 210, 310, 410, or 510 of FIGS. 2-5 (although it is made up of uplink and downlink bands belonging to two different frequency bands).

In an example, the uplink band 912 and the uplink band 914 can be each an uplink block within an uplink band. Similarly, the downlink band 922 and the downlink band 924 can be each a downlink block within a downlink band. Two blocks (uplink blocks or downlink blocks) can be contiguous or non-contiguous in the frequency domain.

In the case of additional pairing, variations may be possible. For example, three or more uplink bands (e.g., each belonging to the frequency band A 810) can be paired with one or more downlink bands (e.g., belonging to the frequency band B 820).

Referring to FIGS. 8-9, the pairing can be generalized to more than two frequency bands and to more than one uplink band and/or downlink band. Say “n” is the number of frequency bands. One or more uplink bands belonging to one or more frequency bands can be paired with one or more downlink bands belonging to one or more frequency bands, as long as the frequency separation between any uplink band and any downlink band is larger than a frequency spacing threshold (e.g., 50 MHz or 100 MHz). As an example, an FDD band can include one uplink band paired with two downlink bands (belonging to the same frequency band) or two uplink bands (belonging to the same frequency band) paired with one DL band.

Figure 10:
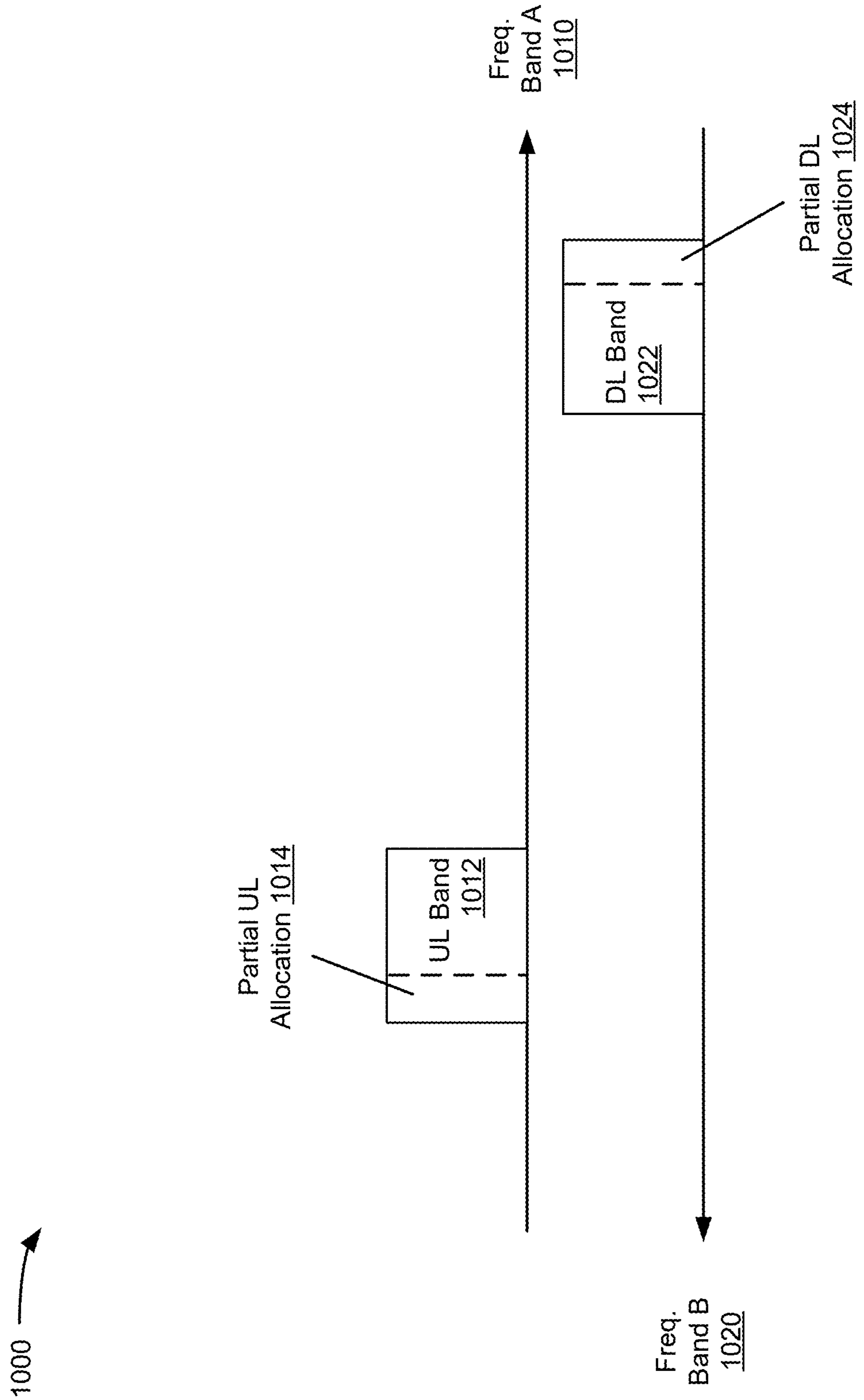
FIG. 10 illustrates an example of an FDD band that includes a partial allocation of an uplink band and/or a downlink band, in accordance with some embodiments.

FIG. 10 illustrates an example of an FDD band 1000 that includes a partial allocation of an uplink band and/or a downlink band, in accordance with some embodiments. In the illustration of FIG. 10, a first frequency band A 1010 includes an uplink band 1012, and a second frequency band B 1020 includes a downlink band 1022. Rather than fully pairing the uplink band 1012 and the downlink band 1022, a partial pairing is used. For example, only a portion of the uplink band 1012 (e.g., a discrete spectrum block shown as “partial UL allocation 1014” in FIG. 10) is paired with the downlink band 1022 or with a portion of the downlink band 1022. Additionally, or alternatively, only a portion of the downlink band 1022 (e.g., a discrete spectrum block shown as “partial DL allocation 1024” in FIG. 10) is paired with the uplink band 1012 or with a portion of the uplink band 1012. The possible partial allocations are illustrated using dashed boxes to indicate that the use of one of them is sufficient, although it may be possible to use them both. The FDD band 1000 can be referred to by a single identifier (e.g., a single band notation) and be treated as a single frequency band similarly to the frequency band 210, 310, 410, or 510 of FIGS. 2-5 (although it is made up of uplink and downlink bands belonging to two different frequency bands).

In an example, the allocated portion of the uplink band 1012 includes a discrete spectrum block (e.g., a set of uplink resource blocks) that is the farthest possible from the downlink band 1022 in the frequency domain. Additionally, or alternatively, the allocated portion of the downlink band 1022 includes a discrete spectrum block (e.g., a set of downlink resource blocks) that is the farthest possible from the uplink band 1012 in the frequency domain. In other examples, the allocated portion(s) is(are) the closest possible in the frequency domain or are in-between the closest and farthest possible locations in the frequency domain. These alternative allocations are possible because the frequency separation between the frequency band A 1010 and the frequency band B 1020 is sufficiently large.

In the example of FIG. 10, discrete spectrum blocks belonging to different frequency bands are illustrated. Nonetheless, other pairings are possible. For example, discrete spectrum blocks belonging to the same frequency band can be paired, as long as the frequency separation between them is sufficiently large.

Referring to FIGS. 8-10, the partial pairing can be generalized to more than two frequency bands, to more than one uplink band and/or downlink band, to more than one portion of an uplink band, and/or to more than one portion of a downlink band. For example, a partial allocation from a first uplink band can be paired with a full or partial allocation of another uplink band and with a full or a partial allocation of a downlink band.

Figure 11:
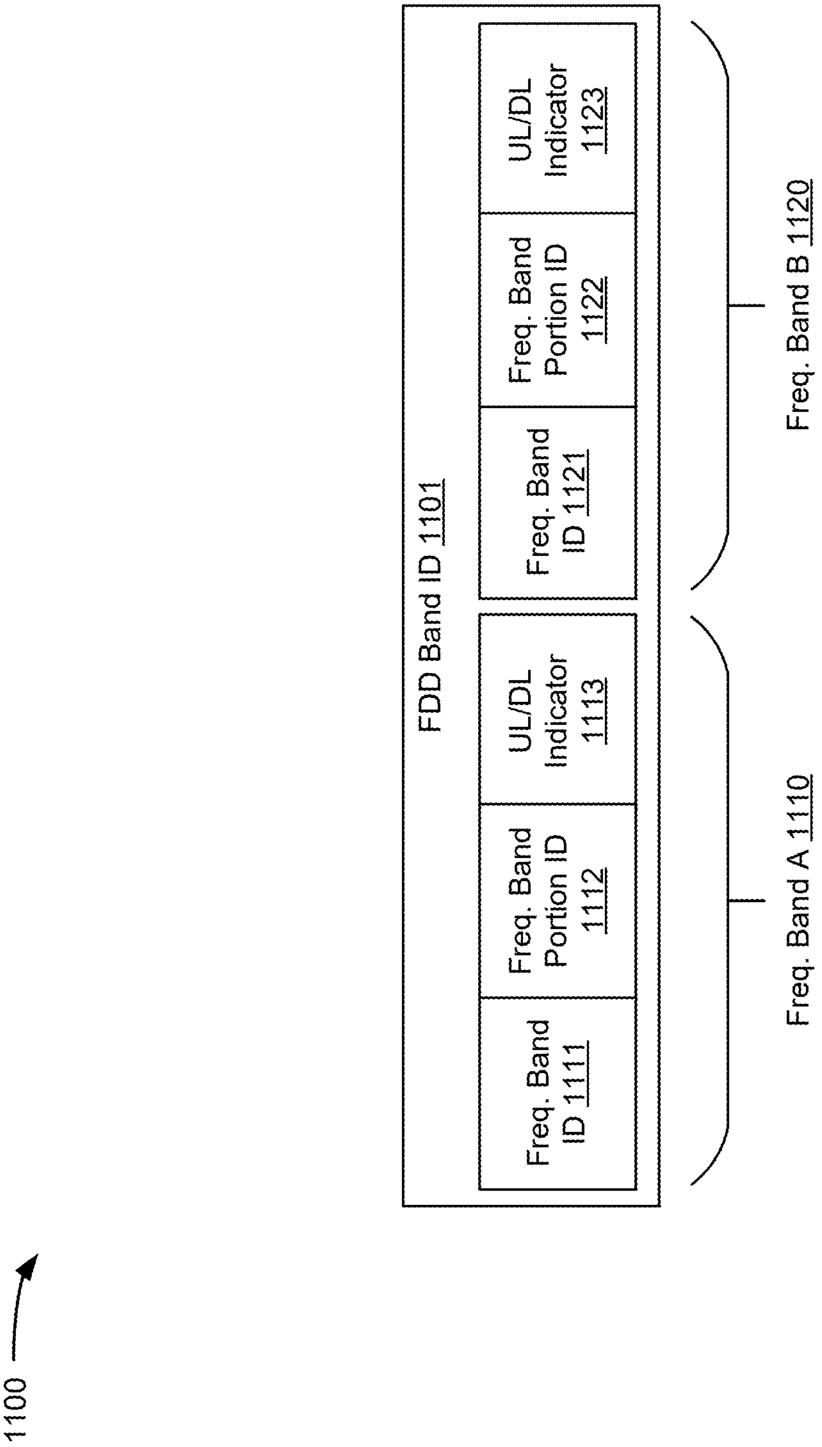
FIG. 11 illustrates an example of an approach to identify an FDD band, in accordance with some embodiments.

FIG. 11 illustrates an example of an approach 1100 to identify an FDD band, in accordance with some embodiments. In the interest of clarity of explanation, the FDD band is similar to the FDD band 700, whereby it is formed by pairing an uplink band and a downlink band belonging to two frequency bands. However, the approach 1100 can be similarly applied to any of the pairings described in connection with FIGS. 8-10.

Generally, the FDD band can be identified using an FDD band identifier (ID) 1101. The FDD band ID 1101 can represent a notation that combines information about the frequency bands from which the paired uplink band(s) and the downlink band(s) (or portion(s) thereof). This information can indicate the ID (e.g., notation) of each frequency band, whether resource blocks allocated therefrom are to be used for uplink or downlink, and/or whether the allocation is partial or not.

In an example, the FDD band ID 1101 includes a frequency band ID 1111 of the first frequency band and a frequency band ID 1121 of the second frequency band. Each of one of the frequency band ID 1111 and the frequency band ID 1121 can be a notation that uniquely identifies the corresponding frequency band. The FDD band ID 1101 can also include a frequency band portion ID 1112 corresponding to a partial allocation using a discrete spectrum block of the first frequency band, and a frequency band portion ID 1122 corresponding to a partial allocation using a discrete spectrum block of the second frequency band. Each of one of the frequency band portion ID 1112 and the frequency band portion ID 1122 can identify the allocated portion of the corresponding frequency band. The FDD band ID 1101 can also include an uplink/downlink indicator 1113 indicating whether the allocated resource blocks of the first frequency band are for uplink transmission or downlink transmission, and an uplink/downlink indicator 1123 indicating whether the allocated resource blocks of the second frequency band are for uplink transmission or downlink transmission. The frequency band ID 1111, the frequency band ID 1121, the frequency band portion ID 1112, the frequency band portion ID 1122, the uplink/downlink indicator 1113, and the uplink/downlink indicator 1123 can be combined using any technique for combining alphanumeric values or text. In an illustrative combination technique, they can be appended in the order shown in FIG. 11, whereby the information about the two frequency bands can be separated by a separator (such as a dash).

For instance and referring to the frequency bands n25 and n26, assume that a first portion of an uplink band of the frequency band n25 is paired with a full downlink band of n26, the FDD band ID 1101 can be set as "n25aU-n26D." In this case, "n25aU" indicates that a portion of an uplink band (referred to as "a") of the frequency band n25 is allocated for the uplink. "n26D" refers to a downlink band of the frequency band n26 is allocated for the downlink.

Using the frequency bands n25, n26, and n71 as an example, where n25 is assumed to include two predefined discrete spectrum blocks, named as n25a and n25b, Table 2 below shows possible flexible FDD band pairings.

TABLE 2

| Notation | Uplink Range (MHz) | Downlink Range (MHz) |
|---|---|---|
| n25a | 1850-1870 | 1930-1950 |
| n25b | 1895-1915 | 1975-1995 |
| n26 | 814-849 | 859-894 |
| n71 | 663-698 | 617-652 |
| n25bU-n26D | 1895-1915 | 859-849 |
| n26U-n25aD | 814-849 | 1930-1950 |
| n25aU-n25bU | 1850-1870 | 1975-1995 |
| n25bU-n71D | 1895-1915 | 617-652 |
| n71U-n26D | 663-698 | 1930-1950 |
| n26U-n71D | 814-849 | 617-652 |
| n71U-n26D | 663-698 | 859-894 |
| n25aU-n26D | 1850-1870 | 859-894 |
| n26U-n25bD | 814-849 | 1975-1995 |
| n25aU-n71D | 1850-1870 | 617-652 |
| n71U-n25bD | 663-698 | 1975-1995 |

Figure 12:
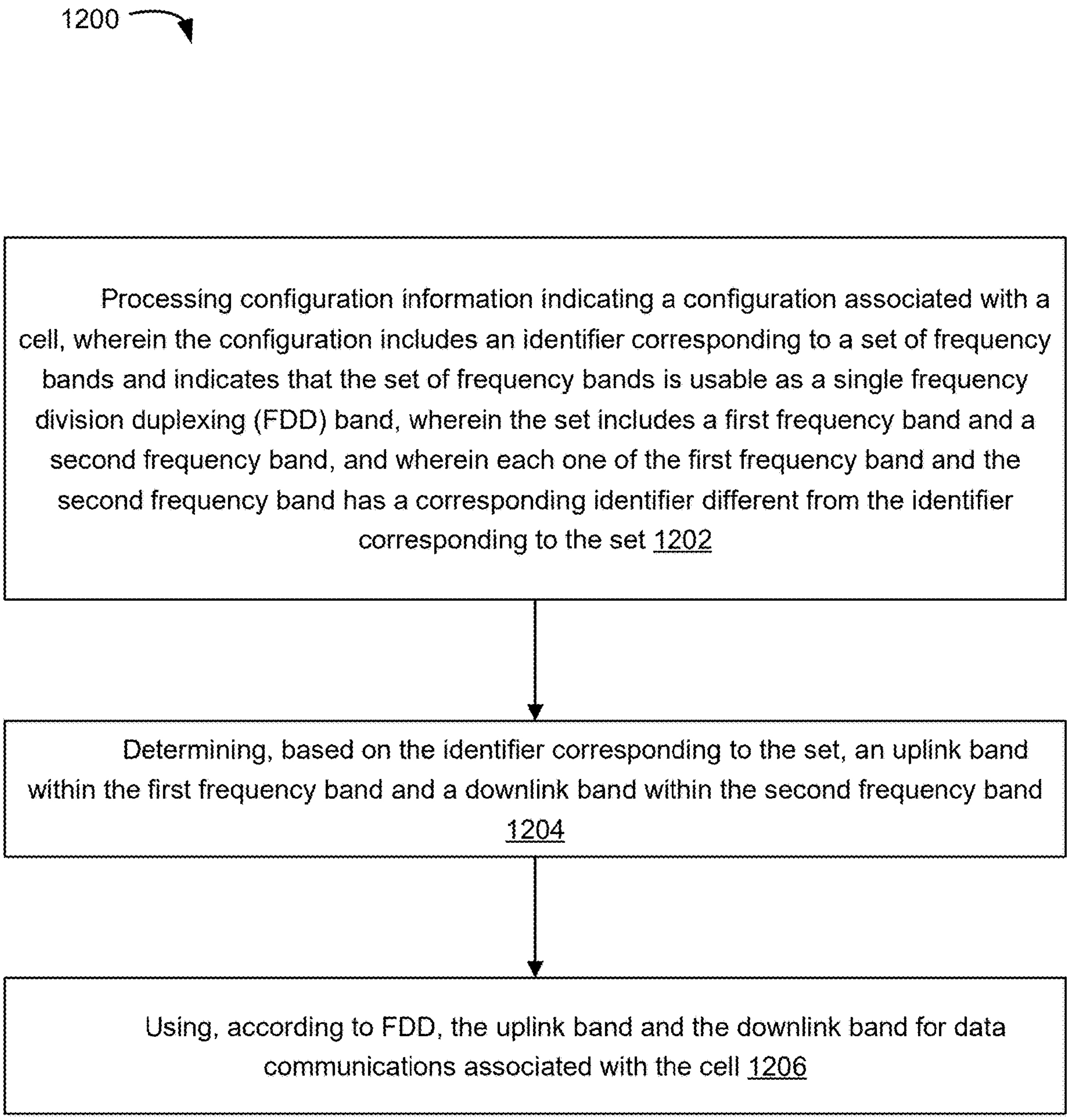
FIG. 12 illustrates an example of an operational flow/algorithmic structure for FDD-based communications by a user equipment, in accordance with some embodiments.

FIG. 12 illustrates an example of an operational flow/algorithmic structure 1200 for FDD-based communications by a UE, in accordance with some embodiments. The operational flow/algorithmic structure 1200 can be implemented by the UE (or an apparatus of the UE, where the apparatus includes processing circuitry). The UE can be any of the UEs described herein. In some embodiments, the operational flow/algorithmic structure 1200 may be implemented by executing instructions stored in a tangible, non-transitory, computer-readable storage medium, such as a memory of the UE. While the operational flow/algorithmic structure 1200 is described using steps in a specific sequence, it should be understood that the present disclosure contemplates that the described steps may be performed in different sequences than the sequence illustrated, and certain described steps may be omitted or not performed altogether.

In an example, the operational flow/algorithmic structure 1200 includes at 1202, processing configuration information indicating a configuration associated with a cell, wherein the configuration includes an identifier corresponding to a set of frequency bands and indicates that the set of frequency bands is usable as a single frequency division duplexing (FDD) band, wherein the set includes a first frequency band and a second frequency band, and wherein each one of the first frequency band and the second frequency band has a corresponding identifier different from the identifier corresponding to the set. For instance, the UE may have received the configuration information from a base station via radio resource control (RRC) signaling. The RRC signaling can indicate an RRC configuration or an RRC reconfiguration for a serving cell having a cell ID. This FDD band can include an uplink-downlink pairing corresponding to any of the pairings of FIGS. 7-10. Further, the identifier can be similar to the one described in FIG. 11. In a further example, subsequent to receiving the configuration information, the UE can receive and process signaling (e.g., medium access control (MAC) control element (CE) or downlink control information (DCI) signaling) including the identifier and indicating that the FDD band is to be used.

In an example, the operational flow/algorithmic structure 1200 includes at 1204, determining, based on the identifier corresponding to the set, an uplink band within the first frequency band and a downlink band within the second frequency band. For instance, based on the identifier, the UE can determine an uplink band to use for uplink transmission and downlink band to use for downlink reception. Specific uplink resource blocks and downlink resource blocks can be allocated accordingly. These resource blocks can span the entirety of the corresponding uplink band and/or downlink band.

In an example, the operational flow/algorithmic structure 1200 includes at 1206, using, according to FDD, the uplink band and the downlink band for data communications associated with the cell. For instance, an uplink transmission uses allocated uplink resource blocks, and a downlink reception uses allocated downlink resource blocks.

Figure 13:
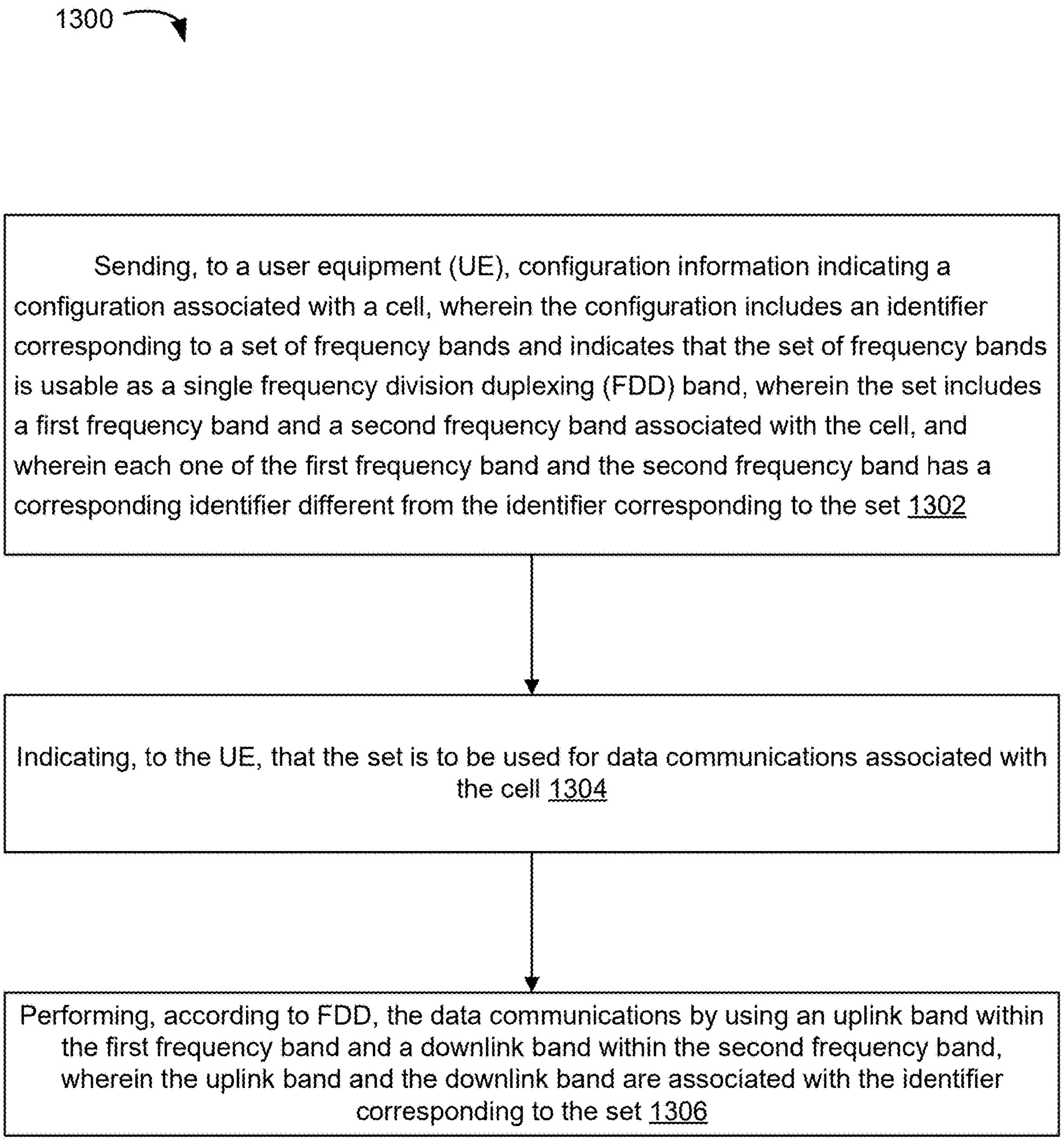
FIG. 13 illustrates an example of an operational flow/algorithmic structure for FDD-based communications by a base station, in accordance with some embodiments.

FIG. 13 illustrates an example of an operational flow/algorithmic structure 1300 for FDD-based communications by a base station, in accordance with some embodiments. The operational flow/algorithmic structure 1300 can be implemented by the base station (or an apparatus of the base station, where the apparatus includes processing circuitry). The base station can be any of the base stations described herein. In some embodiments, the operational flow/algorithmic structure 1300 may be implemented by executing instructions stored in a tangible, non-transitory, computer-readable storage medium, such as a memory of the base station. While the operational flow/algorithmic structure 1300 is described using steps in a specific sequence, it should be understood that the present disclosure contemplates that the described steps may be performed in different sequences than the sequence illustrated, and certain described steps may be omitted or not performed altogether.

In an example, the operational flow/algorithmic structure 1300 includes at 1302, sending, to a user equipment (UE), configuration information indicating a configuration associated with a cell, wherein the configuration includes an identifier corresponding to a set of frequency bands and indicates that the set of frequency bands is usable as a single frequency division duplexing (FDD) band, wherein the set includes a first frequency band and a second frequency band associated with the cell, and wherein each one of the first frequency band and the second frequency band has a corresponding identifier different from the identifier corresponding to the set. For instance, the base station may send the configuration information via radio resource control (RRC) signaling. The RRC signaling can indicate an RRC configuration or an RRC reconfiguration for a serving cell having a cell ID. This FDD band can include an uplink-downlink pairing corresponding to any of the pairings of FIGS. 7-10. Further, the identifier can be similar to the one described in FIG. 11.

In an example, the operational flow/algorithmic structure 1300 includes at 1304, indicate, to the UE, that the set is to be used for data communications associated with the cell. For example, the base station can send MAC CE or DCI signaling including the identifier and indicating that the FDD band is to be used.

In an example, the operational flow/algorithmic structure 1300 includes at 1306, performing, according to FDD, the data communications by using an uplink band within the first frequency band and a downlink band within the second frequency band, wherein the uplink band and the downlink band are associated with the identifier corresponding to the set. For instance, based on the identifier, the UE can determine an uplink band to use for uplink transmission and downlink band to use for downlink reception. Specific uplink resource blocks and downlink resource blocks can be allocated accordingly. These resource blocks can span the entirety of the corresponding uplink band and/or downlink band.

Figure 14:
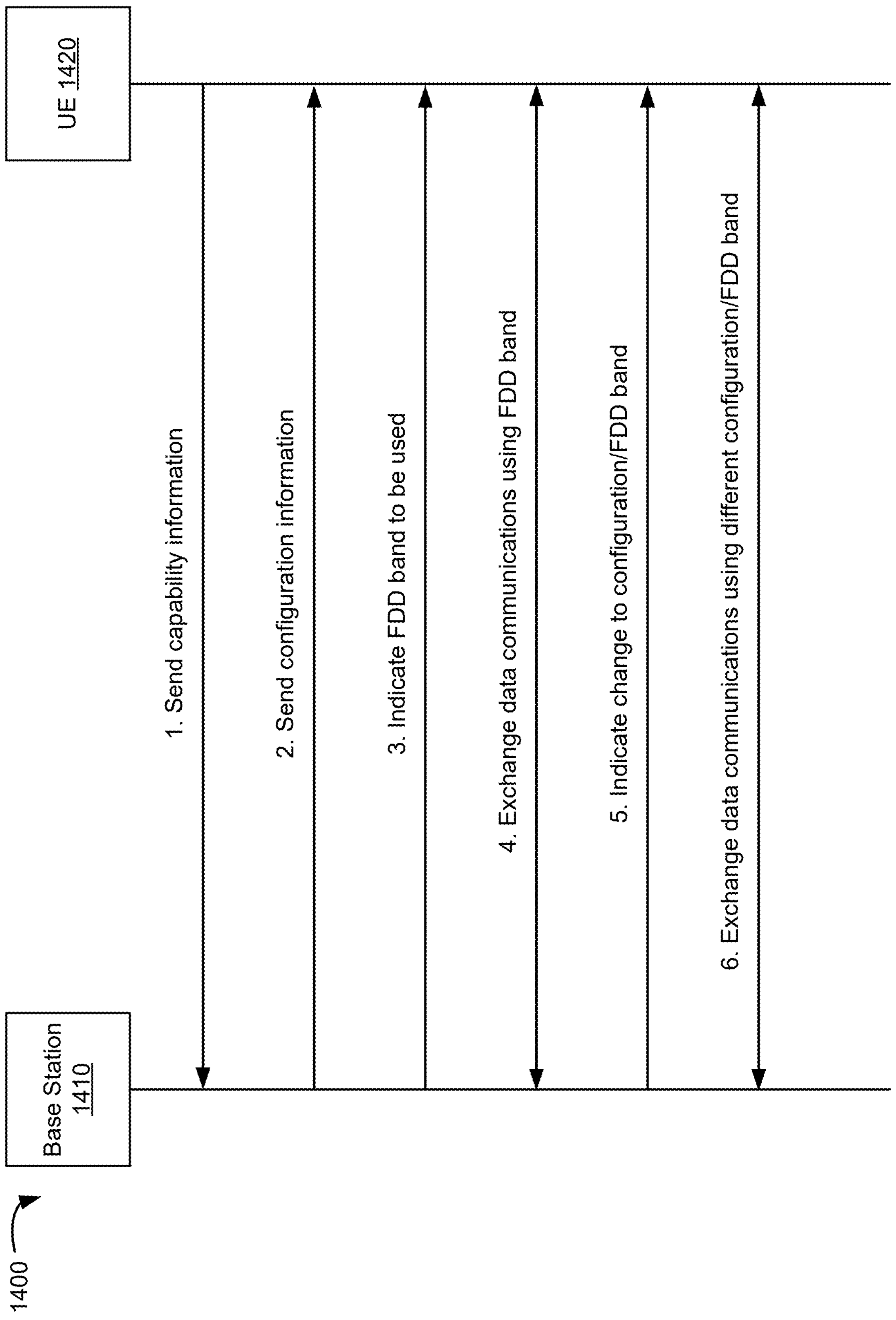
FIG. 14 illustrates an example of a sequence diagram for FDD-based communications, in accordance with some embodiments.

FIG. 14 illustrates an example of a sequence diagram 1400 for FDD-based communications, in accordance with some embodiments. Each step of the sequence diagram can be executed by a base station 1410 (or an apparatus thereof) or a UE 1420 (or an apparatus thereof), or the execution can be distributed therebetween. The base station 1410 and the UE 1420 can be any of the base stations or UEs, respectively, described herein.

As illustrated, in a first step, the UE 1420 sends capability information to the base station 1410. For instance, this capability information can be sent via RRC signaling in response to a capability inquiry. The capability information can indicate that the UE supports a set of frequency bands as a single FDD band for a cell (e.g., supports uplink and downlink pairing to define the single FDD band). The capability information can indicate that this FDD band is not supported for carrier aggregation. The capability information can also indicate other supported frequency bands and/or other supported FDD bands (including for example, that a first frequency band of the set can be used in a pairing for an additional FDD band). To indicate the support, the capability information can include an identifier of each supported FDD band. It may be possible to use a bitmap indicating the support.

In a second step, the base station 1410 sends configuration information to the UE 1420. This configuration information can indicate that the FDD band is one of the candidate bands to use for data communications associated with a cell. The configuration information can be sent using RRC signaling.

In a third step, the base station 1410 can indicate to the UE 1420 that the FDD band is to be used for the data communications. For instance, this indication can be sent in a MAC CE or in DCI.

In a fourth step, the data communications are exchanged between the base station 1410 and the UE 1420 using the FDD band. For instance, resource blocks from the paired uplink and downlink band are allocated and used for the uplink transmissions and downlink transmissions.

In a fifth step, the base station 1410 indicates a change to the configuration associated with the cell or a change to the use of the FDD band. This indication can be via RRC signaling, MAC CE signaling, and/or DCI and can be due to several factors including, for example, a change to channel conditions. The indication can reconfigure or trigger the UE to use only one of the frequency bands of the FDD band (e.g., to switch from using the uplink and downlink pairing to using one of the frequency bands for both the uplink and downlink), use another FDD band), or use a different portion or allocation of resource blocks of an uplink band paired with a downlink band and/or vice versa. Generally, the indication can include an identifier of the frequency band and/or the FDD band and, based on the identifier, the UE can determine the applicable resource blocks to use and switch to use such resource blocks.

In a sixth step, data communications are exchanged between the base station 1410 and the UE 1420 using the different configuration and/or FDD band. For instance, the applicable resource blocks are allocated and used for the uplink transmissions and downlink transmissions.

Figure 15:
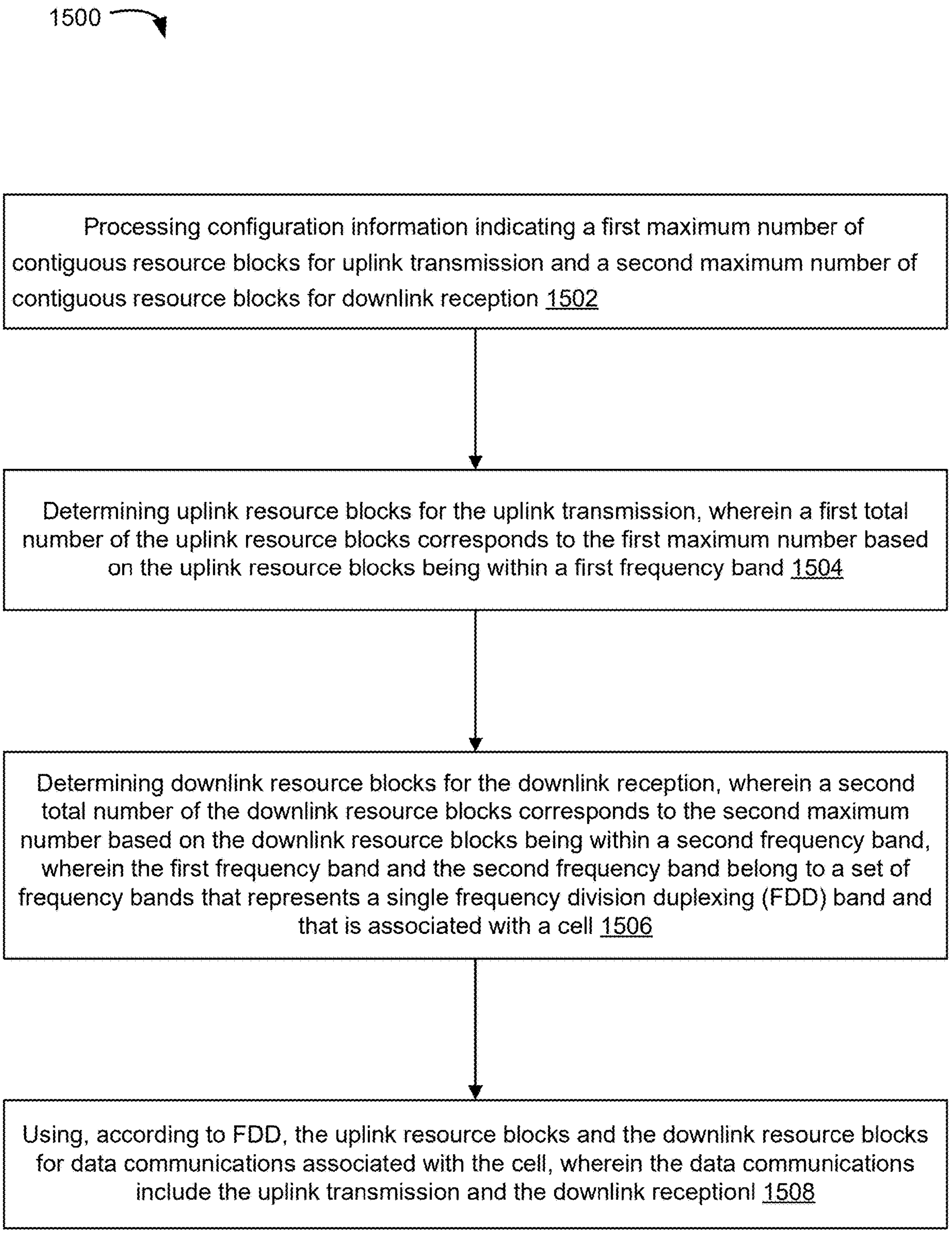
FIG. 15 illustrates an example of an operational flow/algorithmic structure for FDD-based communications by a user equipment using unrestricted resource blocks, in accordance with some embodiments.

FIG. 15 illustrates an example of an operational flow/algorithmic structure 1500 for FDD-based communications by a user equipment using unrestricted resource blocks, in accordance with some embodiments. The operational flow/algorithmic structure 1500 can be implemented by the UE (or an apparatus of the UE, where the apparatus includes processing circuitry). The UE can be any of the UEs described herein. In some embodiments, the operational flow/algorithmic structure 1500 may be implemented by executing instructions stored in a tangible, non-transitory, computer-readable storage medium, such as a memory of the UE. While the operational flow/algorithmic structure 1500 is described using steps in a specific sequence, it should be understood that the present disclosure contemplates that the described steps may be performed in different sequences than the sequence illustrated, and certain described steps may be omitted or not performed altogether.

In an example, the operational flow/algorithmic structure 1500 includes at 1502, processing configuration information indicating a first maximum number of contiguous resource blocks for uplink transmission and a second maximum number of contiguous resource blocks for downlink reception. For instance, the configuration information can be received via RRC signaling and indicates a maximum bandwidth for the uplink (or equivalently, a maximum LCRB for the uplink) and/or a maximum bandwidth for the downlink (or equivalently, a maximum LCRB for the downlink). Additionally, or alternatively, the configuration information can indicate that an FDD band including an uplink-downlink pairing is configured for the UE. This FDD band can be pre-associated (e.g., in a technical specification) with the first maximum number and the second maximum number.

In an example, the operational flow/algorithmic structure 1500 includes at 1504, determining uplink resource blocks for the uplink transmission, wherein a first total number of the uplink resource blocks corresponds to the first maximum number based on the uplink resource blocks being within a first frequency band. For instance, the UE determines that the FDD band is to be used for data communications associated with a cell (e.g., based on DCI, MAC CE, or the configuration information). The FDD band includes an uplink band and a downlink band that are paired. Because the FDD band is to be used, the UE can determine that no uplink resource block restriction is imposed. As such, the UE can determine that the full maximum uplink bandwidth is to be used.

In an example, the operational flow/algorithmic structure 1500 includes at 1506, determining downlink resource blocks for the downlink reception, wherein a second total number of the downlink resource blocks corresponds to the second maximum number based on the downlink resource blocks being within a second frequency band, wherein the first frequency band and the second frequency band belong to a set of frequency bands that represents a single frequency division duplexing (FDD) band and that is associated with a cell. Here also, because the FDD band is to be used, the UE can determine that no downlink resource block restriction is imposed. As such, the UE can determine that the full maximum downlink bandwidth is to be used.

In an example, the operational flow/algorithmic structure 1500 includes at 1508, using, according to FDD, the uplink resource blocks and the downlink resource blocks for data communications associated with the cell, wherein the data communications include the uplink transmission and the downlink reception. For instance, an uplink transmission uses allocated uplink resource blocks, and a downlink reception uses allocated downlink resource blocks.

Figure 16:
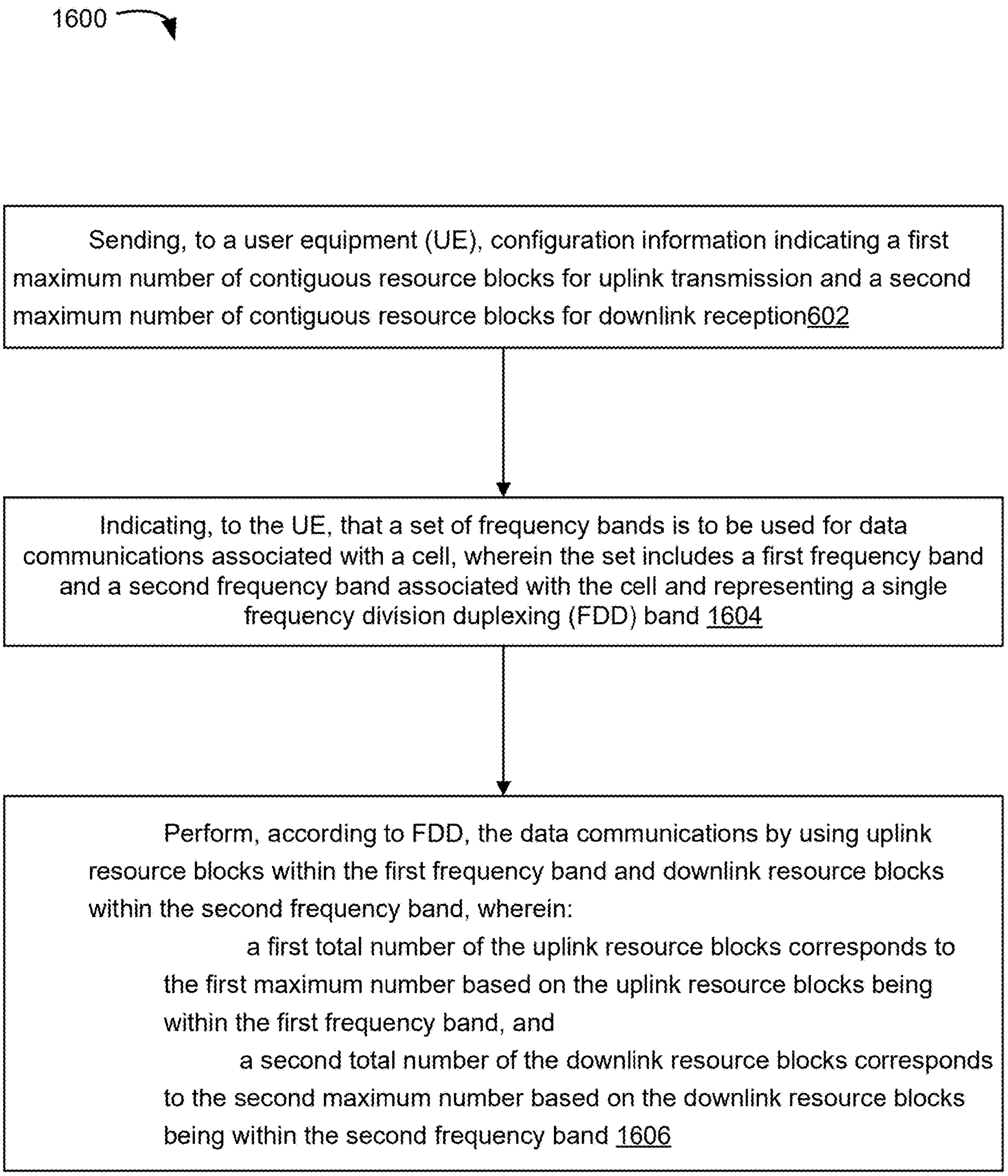
FIG. 16 illustrates an example of an operational flow/algorithmic structure for FDD-based communications by a base station using unrestricted resource blocks, in accordance with some embodiments.

FIG. 16 illustrates an example of an operational flow/algorithmic structure 1600 for FDD-based communications by a base station using unrestricted resource blocks, in accordance with some embodiments. The operational flow/algorithmic structure 1600 can be implemented by the base station (or an apparatus of the base station, where the apparatus includes processing circuitry). The base station can be any of the base stations described herein. In some embodiments, the operational flow/algorithmic structure 1600 may be implemented by executing instructions stored in a tangible, non-transitory, computer-readable storage medium, such as a memory of the base station. While the operational flow/algorithmic structure 1600 is described using steps in a specific sequence, it should be understood that the present disclosure contemplates that the described steps may be performed in different sequences than the sequence illustrated, and certain described steps may be omitted or not performed altogether.

In an example, the operational flow/algorithmic structure 1600 includes at 1602, sending, to a user equipment (UE), configuration information indicating a first maximum number of contiguous resource blocks for uplink transmission and a second maximum number of contiguous resource blocks for downlink reception. For instance, the configuration information can be sent via RRC signaling and indicates a maximum bandwidth for the uplink (or equivalently, a maximum LCRB for the uplink) and/or a maximum bandwidth for the downlink (or equivalently, a maximum LCRB for the downlink). Additionally, or alternatively, the configuration information can indicate that an FDD band including an uplink-downlink pairing is configured for the UE. This FDD band can be pre-associated (e.g., in a technical specification) with the first maximum number and the second maximum number.

In an example, the operational flow/algorithmic structure 1600 includes at 1604, indicating, to the UE, that a set of frequency bands is to be used for data communications associated with a cell, wherein the set includes a first frequency band and a second frequency band associated with the cell and representing a single frequency division duplexing (FDD) band. For instance, RRC, MAC CE or DCI signaling can be used to indicate that the FDD band is to be used.

In an example, the operational flow/algorithmic structure 1600 includes at 1606, performing, according to FDD, the data communications by using uplink resource blocks within the first frequency band and downlink resource blocks within the second frequency band, wherein: a first total number of the uplink resource blocks corresponds to the first maximum number based on the uplink resource blocks being within the first frequency band, and a second total number of the downlink resource blocks corresponds to the second maximum number based on the downlink resource blocks being within the second frequency band. Because the FDD band is to be used, the UE can determine that no uplink resource block restriction and no downlink resource block restriction are imposed. As such, the UE can determine that the full maximum uplink bandwidth and the full maximum downlink bandwidth are to be used. Uplink resource blocks can be allocated and used accordingly for uplink transmissions and downlink resource blocks can be allocated and used accordingly for downlink receptions.

Figure 17:
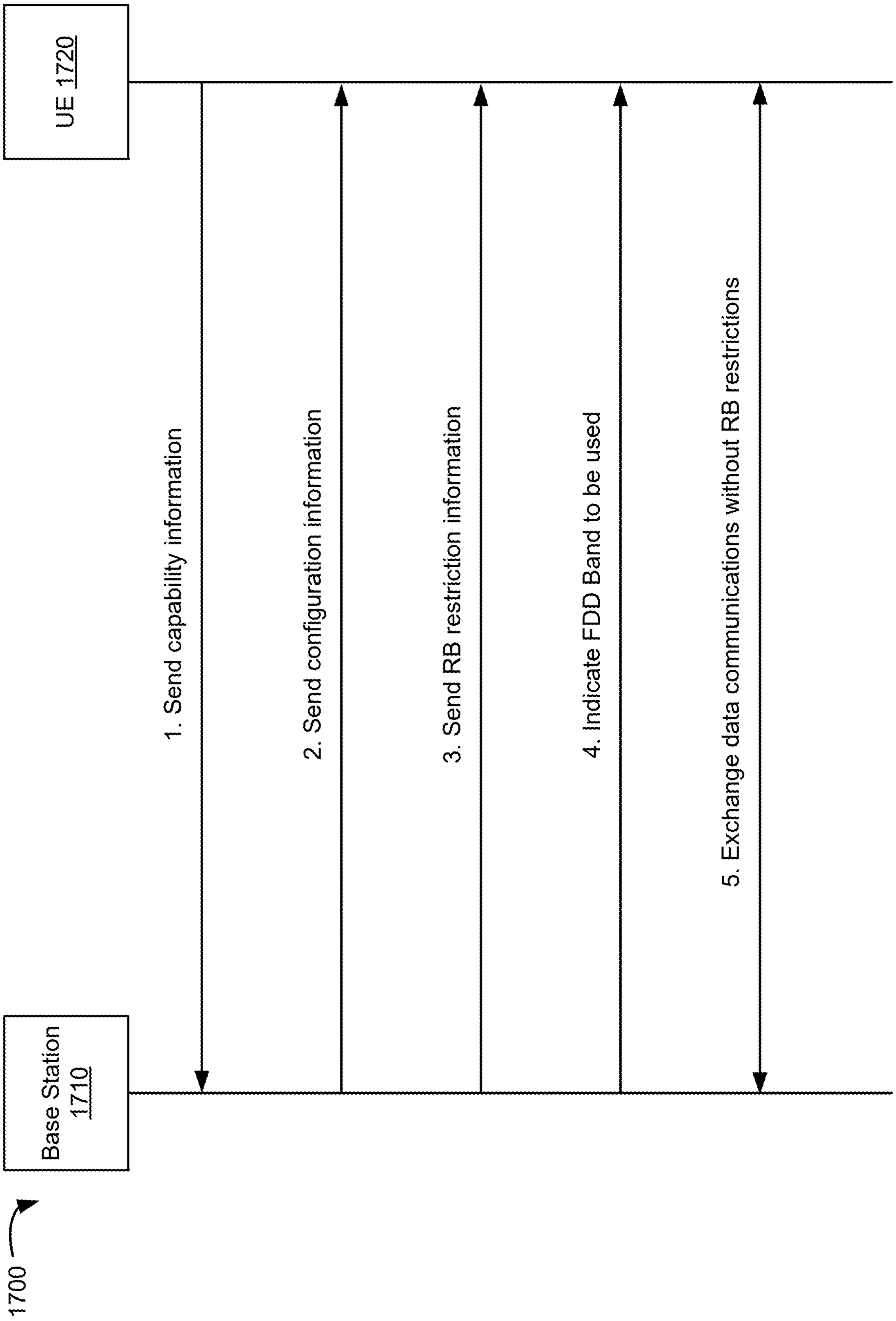
FIG. 17 illustrates an example of a sequence diagram for FDD-based communications using unrestricted resource blocks, in accordance with some embodiments.

FIG. 17 illustrates an example of a sequence diagram 1700 for FDD-based communications using unrestricted resource blocks, in accordance with some embodiments. Each step of the sequence diagram can be executed by a base station 1710 (or an apparatus thereof) or a UE 1720 (or an apparatus thereof), or the execution can be distributed therebetween. The base station 1710 and the UE 1720 can be any of the base stations or UEs, respectively, described herein. Some of the steps are similar to corresponding steps of the sequence diagram 1400. In the interest of brevity, the similarities are not repeated herein but equivalently apply.

As illustrated, in a first step, the UE 1720 sends capability information to the base station 1710. In a second step, the base station 1710 sends configuration information to the UE 1720. In a third step, the base station 1710 sends resource block restriction information to the UE 1720. A restriction can limit or impose a constraint on the uplink LCRB and/or the downlink LCRB. The resource block restriction information can be included in the configuration information or sent separately. Alternatively, the resource block restriction information may not be sent. Instead, the resource block restrictions can be predefined in a technical specification with which the UE 1720 and the base station 1710 are compliant. In a fourth step, the base station 1710 indicate to the UE 1720 that the FDD band is to be used. In a fifth step, data communications can be exchanged between the UE 1720 and the base station 1710 without resource block restrictions. That is because the FDD band is to be used and this FDD band enables the use of the full maximum uplink and downlink bandwidths.

Referring to FIGS. 7-17, flexible FDD uplink-downlink band pairing can be configured and use to provide sufficient frequency separation between uplink and downlink for an FDD band pair to avoid self-interference. The pairing can be among the frequency bands held by the same network operator. The pairing can include a full range or a partial range from a paired uplink band and/or a paired downlink band. Further, the pairing can be within a single FDD band with contiguous or discrete spectrum blocks. The duplex spacing (e.g., the frequency separation) between the paired uplink band and downlink band can be fixed or variable. The paired uplink band and downlink band can be symmetric or asymmetric (e.g., have the same bandwidth or have different bandwidths).

Figure 18:
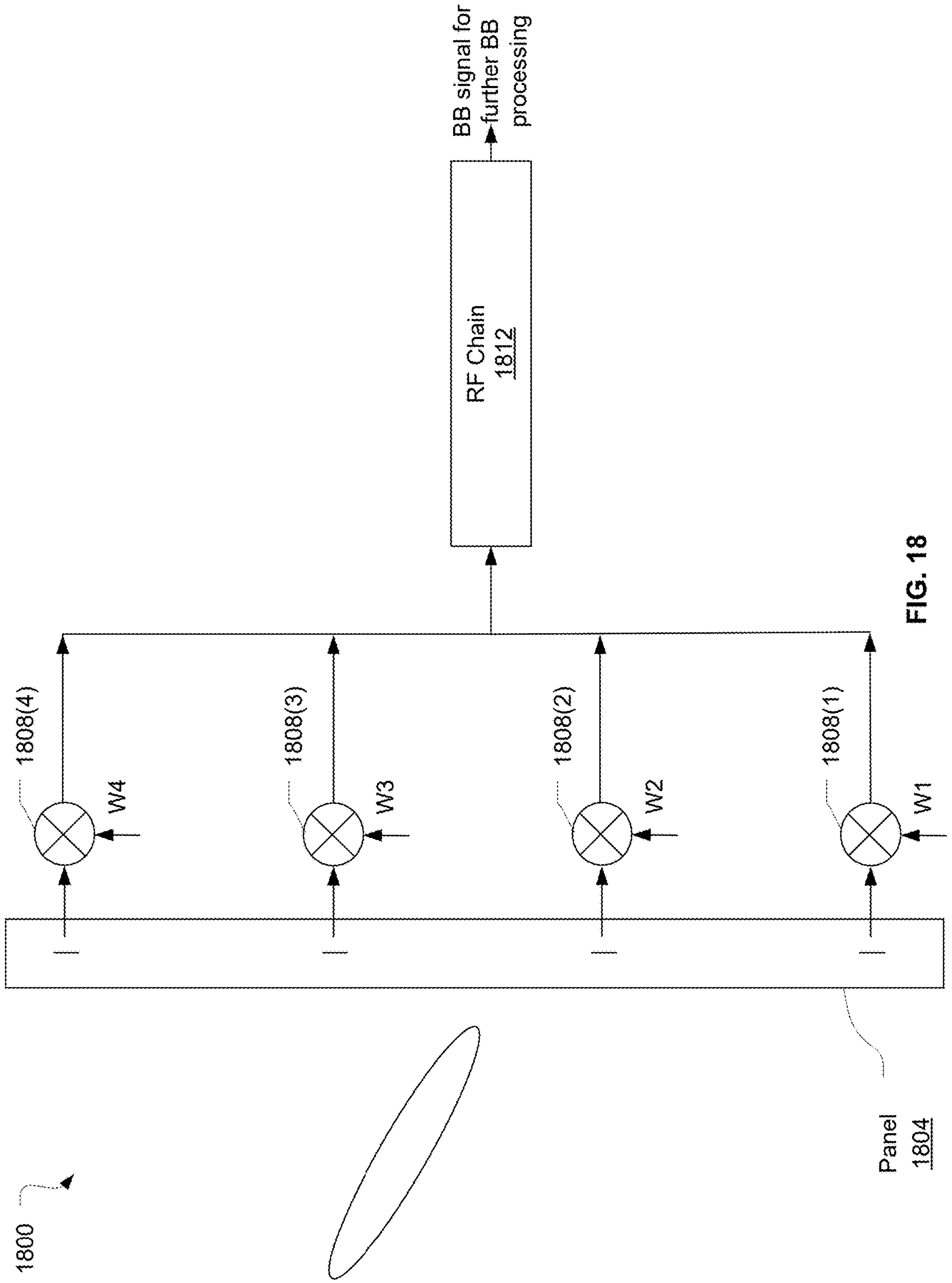
FIG. 18 illustrates an example of receive components in accordance with some embodiments.

FIG. 18 illustrates receive components 1800 of a, such as any of the UE's described herein above, in accordance with some embodiments. The receive components 1800 may include an antenna panel 1804 that includes a number of antenna elements. The panel 1804 is shown with four antenna elements, but other embodiments may include other numbers.

The antenna panel 1804 may be coupled to analog beamforming (BF) components that include a number of phase shifters 1808(1)-1808(4). The phase shifters 1808(1)-1808(4) may be coupled with a radio-frequency (RF) chain 1812. The RF chain 1812 may amplify a receive analog RF signal, down-convert the RF signal to baseband, and convert the analog baseband signal to a digital baseband signal that may be provided to a baseband processor for further processing. In an example, receive components 1800 can include multiple antenna panels 1804 and/or multiple RF chains 1812. An MR can include an antenna panel 1804 and an RF chain 1812. An LP-WUR can include the same antenna panel 1804 or a different antenna panel and a different RF chain 1812.

In various embodiments, control circuitry, which may reside in a baseband processor, may provide BF weights (for example W1-W4), which may represent phase shift values, to the phase shifters 1808(1)-1808(4) to provide a receive beam at the antenna panel 1804. These BF weights may be determined based on the channel-based beamforming.

Figure 19:
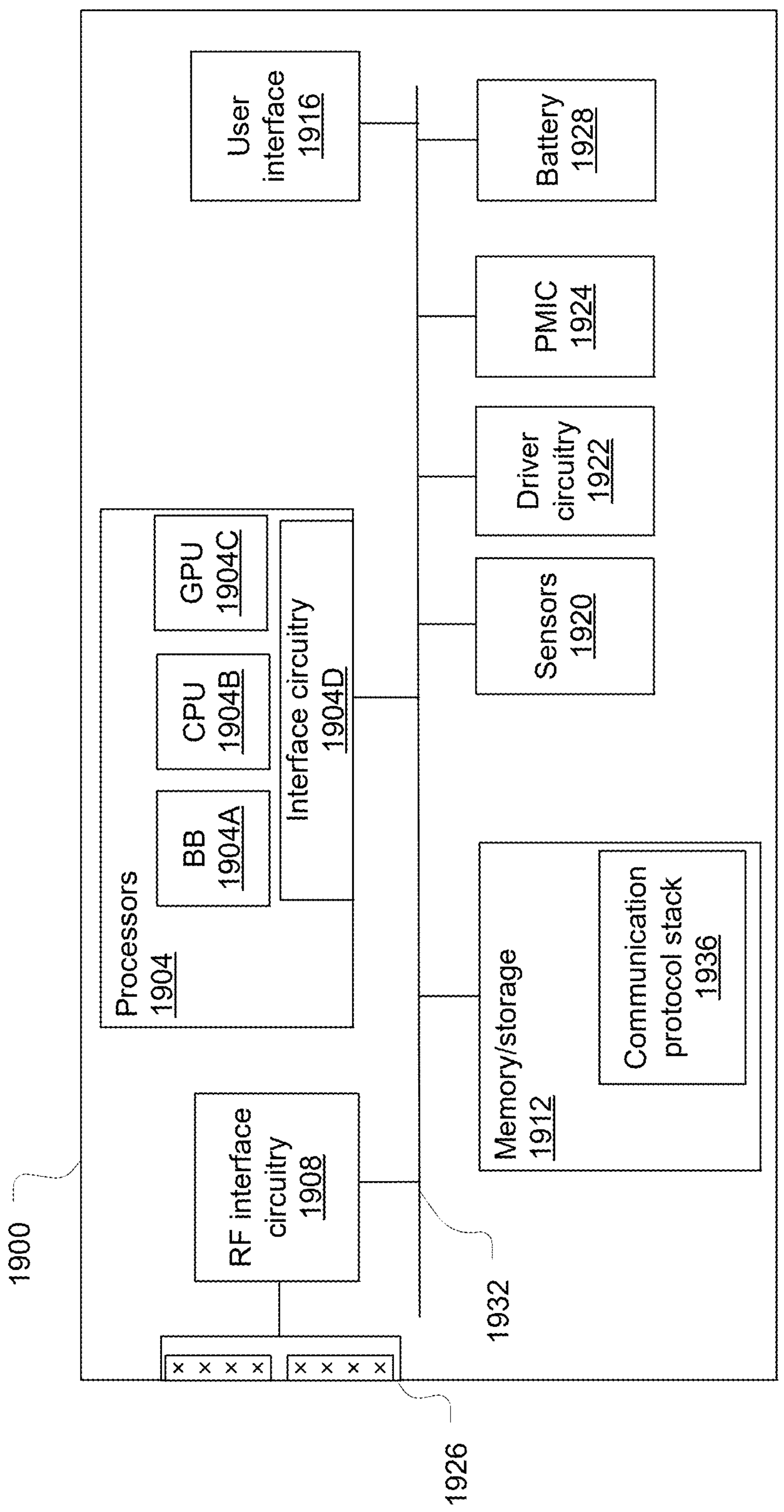
FIG. 19 illustrates an example of a UE in accordance with some embodiments.

FIG. 19 illustrates a UE 1900, in accordance with some embodiments. The UE 1900 may be similar to and substantially interchangeable with any of the UEs described herein above. Particularly, the UE 1900 can send capability information indicating its support of uplink-downlink pairing and for using an FDD band that includes such pairing for FDD-based communications with a base station.

Similar to that described above with respect to UE 104, the UE 1900 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1900 may include processors 1904, RF interface circuitry 1908, memory/storage 1912, user interface 1916, sensors 1920, driver circuitry 1922, power management integrated circuit (PMIC) 1924, and battery 1928. The processors 1904, or portions thereof, can represent processing circuitry that can be coupled with an RF chain to form an MR or the LP-WUR. The components of the UE 1900 may be implemented as integrated circuits (ICs), portions thereof, discrete electronic devices, or other modules, logic, hardware, software, firmware, or a combination thereof. The block diagram of FIG. 19 is intended to show a high-level view of some of the components of the UE 1900. However, some of the components shown may be omitted, additional components may be present, and different arrangements of the components shown may occur in other implementations.

The components of the UE 1900 may be coupled with various other components over one or more interconnects 1932, which may represent any type of interface, input/output, bus (local, system, or expansion), transmission line, trace, optical connection, etc. that allows various circuit components (on common or different chips or chipsets) to interact with one another.

The processors 1904 may include processor circuitry, such as baseband processor circuitry (BB) 1904A, central processor unit circuitry (CPU) 1904B, and graphics processor unit circuitry (GPU) 1904C. The processors 1904 may include any type of circuitry or processor circuitry that executes or otherwise operates computer-executable instructions, such as program code, software modules, or functional processes from memory/storage 1912 to cause the UE 1900 to perform operations as described herein.

In some embodiments, the baseband processor circuitry 1904A may access a communication protocol stack 1936 in the memory/storage 1912 to communicate over a 3GPP compatible network. In general, the baseband processor circuitry 1904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1908.

The baseband processor circuitry 1904A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1904A may also access group information from memory/storage 1912 to determine search space groups in which a number of repetitions of a PDCCH may be transmitted.

The memory/storage 1912 may include any type of volatile or non-volatile memory that may be distributed throughout the UE 1900. In some embodiments, some of the memory/storage 1912 may be located on the processors 1904 themselves (for example, L1 and L2 cache), while other memory/storage 1912 is external to the processors 1904 but accessible thereto via a memory interface. The memory/storage 1912 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1908 may include transceiver circuitry and a radio frequency front module (RFEM) that allows the UE 1900 to communicate with other devices over a radio access network. The RF interface circuitry 1908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1950 and proceed to filter and amplify (with a low-noise amplifier) the signal. The signal may be provided to a receiver of the transceiver that down-converts the RF signal into a baseband signal that is provided to the baseband processor of the processors 1904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1950.

In various embodiments, the RF interface circuitry 1908 may be configured to transmit/receive signals in a manner compatible with NR access technologies.

The antenna 1950 may include a number of antenna elements that each convert electrical signals into radio waves to travel through the air and to convert received radio waves into electrical signals. The antenna elements may be arranged into one or more antenna panels. The antenna 1950 may have antenna panels that are omnidirectional, directional, or a combination thereof to enable beamforming and multiple input, multiple output communications. The antenna 1950 may include microstrip antennas, printed antennas fabricated on the surface of one or more printed circuit boards, patch antennas, phased array antennas, etc. The antenna 1950 may have one or more panels designed for specific frequency bands including bands in FR1 or FR2.

The user interface circuitry 1916 includes various input/output (I/O) devices designed to enable user interaction with the UE 1900. The user interface 1916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs) and multi-character visual outputs, or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 1900.

The sensors 1920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1922 may include software and hardware elements that operate to control particular devices that are embedded in the UE 1900, attached to the UE 1900, or otherwise communicatively coupled with the UE 1900. The driver circuitry 1922 may include individual drivers allowing other components to interact with or control various input/output (I/O) devices that may be present within, or connected to, the UE 1900. For example, driver circuitry 1922 may include a display driver to control and allow access to a display device, a touchscreen driver to control and allow access to a touchscreen interface, sensor drivers to obtain sensor readings of sensor circuitry 1920 and control and allow access to sensor circuitry 1920, drivers to obtain actuator positions of electro-mechanic components or control and allow access to the electro-mechanic components, a camera driver to control and allow access to an embedded image capture device, audio drivers to control and allow access to one or more audio devices.

The PMIC 1924 may manage power provided to various components of the UE 1900. In particular, with respect to the processors 1904, the PMIC 1924 may control power-source selection, voltage scaling, battery charging, or DC-to-DC conversion.

In some embodiments, the PMIC 1924 may control, or otherwise be part of, various power saving mechanisms of the UE 1900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1900 may power down for brief intervals of time and thus save power. If there is no data traffic activity for an extended period of time, then the UE 1900 may transition off to an RRC_Idle state, where it disconnects from the network and does not perform operations, such as channel quality feedback, handover, etc. The UE 1900 goes into a very low power state and it performs paging where again it periodically wakes up to listen to the network and then powers down again. The UE 1900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1928 may power the UE 1900, although in some examples the UE 1900 may be mounted deployed in a fixed location and may have a power supply coupled to an electrical grid. The battery 1928 may be a lithium-ion battery, a metal-air battery, such as a zinc-air battery, an aluminum-air battery, a lithium-air battery, and the like. In some implementations, such as in vehicle-based applications, the battery 1928 may be a typical lead-acid automotive battery.

Figure 20:
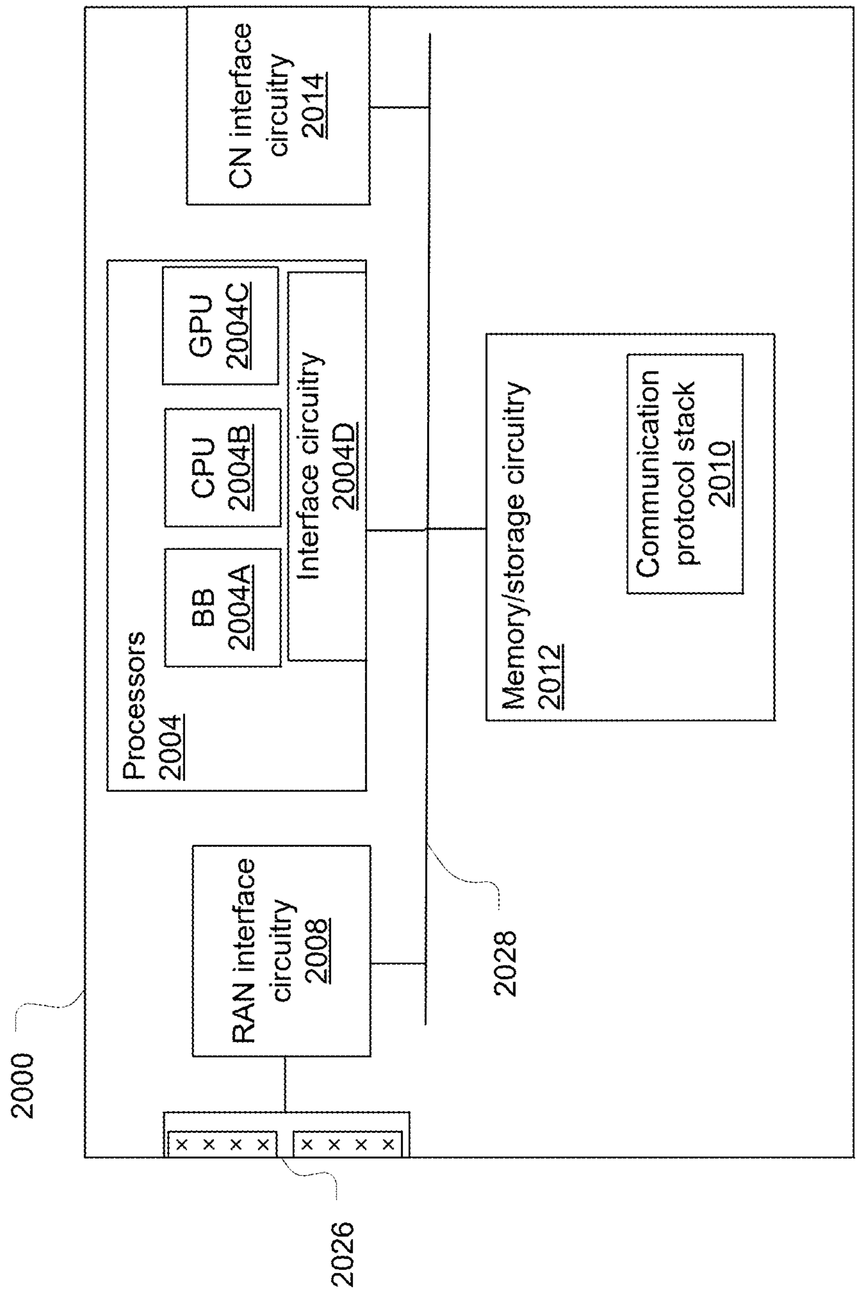
FIG. 20 illustrates an example of a base station in accordance with some embodiments.

FIG. 20 illustrates a base station 2000, in accordance with some embodiments. The base station 2000 may be similar to and substantially interchangeable with the base station 108 of FIG. 1 and other base stations described herein above. Particularly, the base station 2000 can receive capability information indicating a UE's support of uplink-downlink pairing for FDD-based communications, configure the UE to use and FDD band that includes such pairing, and perform the FDD-based communications.

The base station 2000 may include processors 2004, RAN interface circuitry 2008, core network (CN) interface circuitry 2012, and memory/storage circuitry 2016.

The components of the base station 2000 may be coupled with various other components over one or more interconnects 2028.

The processors 2004, RAN interface circuitry 2008, memory/storage circuitry 2016 (including communication protocol stack 2010), antenna 2050, and interconnects 2028 may be similar to like-named elements shown and described with respect to FIG. 19.

The CN interface circuitry 2012 may provide connectivity to a core network, for example, a Fifth Generation Core network (5GC) using a 5GC-compatible network interface protocol, such as carrier Ethernet protocols, or some other suitable protocol. Network connectivity may be provided to/from the base station 2000 via a fiber optic or wireless backhaul. The CN interface circuitry 2012 may include one or more dedicated processors or FPGAs to communicate using one or more of the aforementioned protocols. In some implementations, the CN interface circuitry 2012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method, the method comprising: processing configuration information indicating a configuration associated with a cell, wherein the configuration includes an identifier corresponding to a set of frequency bands and indicates that the set of frequency bands is usable as a single frequency division duplexing (FDD) band, wherein the set includes a first frequency band and a second frequency band, and wherein each one of the first frequency band and the second frequency band has a corresponding identifier different from the identifier corresponding to the set; determining, based on the identifier corresponding to the set, an uplink band within the first frequency band and a downlink band within the second frequency band; and using, according to FDD, the uplink band and the downlink band for data communications associated with the cell.

Example 2 includes a method, the method comprising: sending, to a user equipment (UE), configuration information indicating a configuration associated with a cell, wherein the configuration includes an identifier corresponding to a set of frequency bands and indicates that the set of frequency bands is usable as a single frequency division duplexing (FDD) band, wherein the set includes a first frequency band and a second frequency band associated with the cell, and wherein each one of the first frequency band and the second frequency band has a corresponding identifier different from the identifier corresponding to the set; indicating, to the UE, that the set is to be used for data communications associated with the cell; and performing, according to FDD, the data communications by using an uplink band within the first frequency band and a downlink band within the second frequency band, wherein the uplink band and the downlink band are associated with the identifier corresponding to the set.

Example 3 includes a method, the method comprising: determining configuration information indicating a configuration associated with a cell, wherein the configuration includes an identifier corresponding to a set of frequency bands and indicates that the set of frequency bands is usable as a single frequency division duplexing (FDD) band, wherein the set includes a first frequency band and a second frequency band, and wherein each one of the first frequency band and the second frequency band has a corresponding identifier different from the identifier corresponding to the set, determining, based on the identifier corresponding to the set, an uplink band within the first frequency band and a downlink band within the second frequency band; and causing downlink reception via the receiver and uplink transmission via the transmitter, according to FDD, such that the uplink band and the downlink band are used for data communications associated with the cell.

Example 4 includes the method of any preceding example 1-3, further comprising: sending or receiving capability information indicating support of using the set of frequency bands as the single FDD band for the cell.

Example 5 includes the method of example 4, wherein capability information further indicates that using the set of frequency bands for carrier aggregation is unsupported.

Example 6 includes the method of any preceding example 4-5, wherein capability information further indicates support of using the first frequency band as an additional single FDD band for the cell.

Example 7 includes the method of any preceding example 1-6, further comprising: determining a change to the configuration associated with the cell, wherein the change indicates that only the first frequency band is to be used for additional data communications associated with the cell; determining, based on the change, at least one of a different uplink band or a different downlink band within the first frequency band; and using or causing usage of, according to the FDD, the at least one of the different uplink band or the different downlink band for the additional data communications.

Example 8 includes the method of any preceding example 1-7, further comprising: determining a change to the configuration associated with the cell, wherein the change indicates that a different set of first frequency bands is to be used as a single frequency band for additional data communications associated with the cell; determining, based on the change, at least one of a different uplink band or a different downlink band within the different set; and using or causing usage of, according to the FDD, the at least one of the different uplink band or the different downlink band for the additional data communications.

Example 9 includes the method of any preceding example 1-8, further comprising: determining a change to the configuration associated with the cell, wherein the change indicates a different identifier of the first frequency band, wherein the different identifier is associated with at least one of a different uplink band or a different downlink band within the first frequency band; determining, based on the different identifier, the at least one of the different uplink band or the different downlink band; and using or causing usage of, according to the FDD, the at least one of the different uplink band or the different downlink band for additional data communications associated with the cell.

Example 10 includes the method of any preceding example 1-9, wherein the identifier corresponding to the set includes a combination of the identifier corresponding to the first frequency band and the identifier of the second frequency band.

Example 11 includes the method of any preceding example 1-10, wherein the identifier corresponding to the set indicates that the first frequency band is to be used for uplink transmission and that the second frequency band is to be used for downlink transmission.

Example 12 includes the method of any preceding example 1-11, wherein the identifier corresponding to the set indicates that a portion of the first frequency band is to be used for uplink transmission, and wherein the uplink is within the portion.

Example 13 includes the method of any preceding example 1-12, wherein the identifier corresponding to the set is associated with an uplink frequency range corresponding to the first frequency band and a downlink frequency range corresponding to the second frequency band.

Example 14 includes the method of any preceding example 1-13, wherein the set further includes a third frequency range, and wherein the method further comprises: determining, based on the identifier corresponding to the set, an additional uplink band or an additional downlink band within the third frequency band, wherein the additional uplink band or the additional downlink band is used for the data communications.

Example 15 includes the method of any preceding example 1-14, wherein the first frequency band and the second frequency band form an uplink and downlink band pair that provides a frequency separation between the uplink band and the downlink band, wherein the frequency separation is larger than a predefined threshold.

Example 16 includes the method of any preceding example 1-15, wherein the first frequency band and the second frequency band are associated with a same network operator.

Example 17 includes the method of any preceding example 1-16, wherein the uplink band corresponds to a partial frequency range or a full frequency range of an FDD uplink band within the first frequency range.

Example 18 includes the method of any preceding example 1-17, further comprising: sending or receiving capability information indicating support of using the first frequency band as an additional single FDD band with contiguous or discrete spectrum portions.

Example 19 includes the method of any preceding example 1-18, wherein the single FDD band has a fixed or variable duplex spacing between the first frequency band and the second frequency band.

Example 20 includes the method of any preceding example 1-19, wherein the uplink band has a first bandwidth, wherein the downlink band has a second bandwidth, and wherein the first bandwidth and the second bandwidth are the same or are different.

Example 21 includes a user equipment (UE) or an apparatus comprising: one or more processors; and one or more memory storing instructions that, upon execution by the one or more processors, configure the UE or the apparatus to perform a method described in or related to any of the preceding examples.

Example 22 includes one or more computer-readable media storing instructions that, when executed on a user equipment (UE) or an apparatus, cause the UE or the apparatus to perform operations comprising one or more elements of a method described in or related to any of the preceding examples.

Example 23 includes an apparatus comprising means to perform one or more elements of a method described in or related to any of the preceding examples.

Example 24 includes one or more non-transitory computer-readable media comprising instructions to cause an apparatus, upon execution of the instructions by one or more processors of the apparatus, to perform one or more elements of a method described in or related to any of the preceding examples.

Example 25 includes an apparatus comprising logic, modules, or processing circuitry configured to perform one or more elements of a method described in or related to any of the preceding examples.

Example 26 includes an apparatus, a network, a base station, or a system comprising: one or more processors and one or more computer-readable media comprising instructions that, when executed by the one or more processors, cause the one or more processors to perform one or more elements of a method described in or related to any of the preceding examples.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:

processing configuration information indicating a configuration associated with a cell, wherein the configuration includes an identifier corresponding to a set of frequency bands and indicates that the set of frequency bands is usable as a single frequency division duplexing (FDD) band, wherein the set includes a first frequency band and a second frequency band, and wherein each one of the first frequency band and the second frequency band has a corresponding identifier different from the identifier corresponding to the set;

determining, based on the identifier corresponding to the set, an uplink band within the first frequency band and a downlink band within the second frequency band; and using, according to FDD, the uplink band and the downlink band for data communications associated with the cell.

2. The method of claim 1, further comprising:

sending capability information indicating support of using the set of frequency bands as the single FDD band for the cell.

3. The method of claim 2, wherein capability information further indicates that using the set of frequency bands for carrier aggregation is unsupported.

4. The method of claim 2, wherein capability information further indicates support of using the first frequency band as an additional single FDD band for the cell.

5. The method of claim 1, further comprising:

determining a change to the configuration associated with the cell, wherein the change indicates that only the first frequency band is to be used for additional data communications associated with the cell;

determining, based on the change, at least one of a different uplink band or a different downlink band within the first frequency band; and using, according to the FDD, the at least one of the different uplink band or the different downlink band for the additional data communications.

6. The method of claim 1, further comprising:

determining a change to the configuration associated with the cell, wherein the change indicates that a different set of first frequency bands is to be used as a single frequency band for additional data communications associated with the cell;

determining, based on the change, at least one of a different uplink band or a different downlink band within the different set; and using, according to the FDD, the at least one of the different uplink band or the different downlink band for the additional data communications.

7. The method of claim 1, further comprising:

determining a change to the configuration associated with the cell, wherein the change indicates a different identifier of the first frequency band, wherein the different identifier is associated with at least one of a different uplink band or a different downlink band within the first frequency band;

determining, based on the different identifier, the at least one of the different uplink band or the different downlink band; and using, according to the FDD, the at least one of the different uplink band or the different downlink band for additional data communications associated with the cell.

8. The method of claim 1, wherein the identifier corresponding to the set includes a combination of the identifier corresponding to the first frequency band and the identifier of the second frequency band.

9. The method of claim 1, wherein the identifier corresponding to the set indicates that the first frequency band is to be used for uplink transmission and that the second frequency band is to be used for downlink transmission.

10. The method of claim 1, wherein the identifier corresponding to the set indicates that a portion of the first frequency band is to be used for uplink transmission, and wherein the uplink band is within the portion.

11. The method of claim 1, wherein the identifier corresponding to the set is associated with an uplink frequency range corresponding to the first frequency band and a downlink frequency range corresponding to the second frequency band.

12. The method of claim 1, wherein the set further includes a third frequency range, and wherein the method further comprises:

determining, based on the identifier corresponding to the set, an additional uplink band or an additional downlink band within the third frequency range, wherein the additional uplink band or the additional downlink band is used for the data communications.

13. A base station comprising:

one or more processors; and one or more memories storing instructions that, upon execution by the one or more processors, configure the base station to:

send, to a user equipment (UE), configuration information indicating a configuration associated with a cell, wherein the configuration includes an identifier corresponding to a set of frequency bands and indicates that the set of frequency bands is usable as a single frequency division duplexing (FDD) band, wherein the set includes a first frequency band and a second frequency band associated with the cell, and wherein each one of the first frequency band and the second frequency band has a corresponding identifier different from the identifier corresponding to the set;

indicate, to the UE, that the set is to be used for data communications associated with the cell; and perform, according to FDD, the data communications by using an uplink band within the first frequency band and a downlink band within the second frequency band, wherein the uplink band and the downlink band are associated with the identifier corresponding to the set.

14. The base station of claim 13, wherein the first frequency band and the second frequency band form an uplink and downlink band pair that provides a frequency separation between the uplink band and the downlink band, wherein the frequency separation is larger than a predefined threshold.

15. The base station of claim 13, wherein the first frequency band and the second frequency band are associated with a same network operator.

16. The base station of claim 13, wherein the uplink band corresponds to a partial frequency range or a full frequency range of an FDD uplink band.

17. An apparatus comprising:

a receiver;

a transmitter; and processing circuitry communicatively coupled with the receiver and the transmitter and configured to:

determine configuration information indicating a configuration associated with a cell, wherein the configuration includes an identifier corresponding to a set of frequency bands and indicates that the set of frequency bands is usable as a single frequency division duplexing (FDD) band, wherein the set includes a first frequency band and a second frequency band, and wherein each one of the first frequency band and the second frequency band has a corresponding identifier different from the identifier corresponding to the set;

determine, based on the identifier corresponding to the set, an uplink band within the first frequency band and a downlink band within the second frequency band; and cause downlink reception via the receiver and uplink transmission via the transmitter, according to FDD, such that the uplink band and the downlink band are used for data communications associated with the cell.

18. The apparatus of claim 17, wherein the processing circuitry is further configured to:

send capability information indicating support of using the first frequency band as an additional single FDD band with contiguous or discrete spectrum portions.

19. The apparatus of claim 17, wherein the single FDD band has a fixed or variable duplex spacing between the first frequency band and the second frequency band.

20. The apparatus of claim 17, wherein the uplink band has a first bandwidth, wherein the downlink band has a second bandwidth, and wherein the first bandwidth and the second bandwidth are the same or are different.

* * * * *